(12) United States Patent
Sarwat et al.

(10) Patent No.: US 11,750,036 B2
(45) Date of Patent: Sep. 5, 2023

(54) SYSTEMS AND METHODS FOR PROVIDING INDUCTIVE POWER TRANSFER POWER CONTROL

(71) Applicants: Arif I. Sarwat, Miami, FL (US); Hassan Jafari, Miami, FL (US)

(72) Inventors: Arif I. Sarwat, Miami, FL (US); Hassan Jafari, Miami, FL (US)

(73) Assignee: THE FLORIDA INTERNATIONAL UNIVERSITY BOARD OF TRUSTEES, Miami, FL (US)

(*) Notice: Subject to any disclaimer, the term of this patent is extended or adjusted under 35 U.S.C. 154(b) by 0 days.

(21) Appl. No.: 18/059,567

(22) Filed: Nov. 29, 2022

(65) Prior Publication Data

US 2023/0170740 A1     Jun. 1, 2023

Related U.S. Application Data

(60) Provisional application No. 63/264,696, filed on Nov. 30, 2021.

(51) Int. Cl.
*H02J 50/12* (2016.01)
*H02M 1/08* (2006.01)
*H02M 5/293* (2006.01)
*H02J 7/00* (2006.01)

(52) U.S. Cl.
CPC .......... *H02J 50/12* (2016.02); *H02J 7/00712* (2020.01); *H02M 1/083* (2013.01); *H02M 5/2932* (2021.05)

(58) Field of Classification Search
CPC .... H02J 50/12; H02J 7/00712; H02M 5/2932; H02M 1/083
See application file for complete search history.

(56) References Cited

U.S. PATENT DOCUMENTS 10,355,532 B2 * 7/2019 Walton .................. H02J 50/12
2018/0375390 A1 * 12/2018 Sieber ..................... B60L 53/22

* cited by examiner

*Primary Examiner* — Adolf D Berhane
(74) *Attorney, Agent, or Firm* — Saliwanchik, Lloyd & Eisenschenk

(57) ABSTRACT

Power controllers (e.g., inductive power transfer (IPT) power controllers) and methods of making and using the same are provided. An IPT power controller can be implemented on direct alternating current (AC)-AC converters and can use only current and voltage measurements to produce multi-power level IPT controller and design switching logic. Using Boolean operators (e.g., AND, OR, Not) applied on a resonant current signal, varying positive energy injections (e.g., 1 to 16 pulses), and varying negative energy injections (e.g., 1 to 16 pulses), up to 32 different active states can be designed.

20 Claims, 25 Drawing Sheets

| Mode | Type | $S_{inj}$ | $S_v(V_{AC}>0)$ | $S_c(i_{res}>0)$ | SW1 | SW2 | SW3 | SW4 |
|---|---|---|---|---|---|---|---|---|
| 1 | Injection | 1 | 1 | 1 | count5(t) | 0 | 0 | count5(t) |
| 2 | Injection | 1 | 1 | 0 | 0 | count4(t) | count4(t) | 0 |
| 3 | Injection | 1 | 0 | 1 | 0 | count5(t) | count5(t) | 0 |
| 4 | Injection | 1 | 0 | 0 | count4(t) | 0 | 0 | count4(t) |
| 5 | zero Injection | 0 | 1 | 1 | 1 | 1 | 1 | 1 |
| 6 | zero Injection | 0 | 1 | 0 | 0 | 1 | 0 | 1 |

FIG. 16

| Parameter | Value |
|---|---|
| Gap distance | 200 mm |
| transmitter pad diameter | 352 mm |
| Primary and Secondary Compensation capacitors ($C_p$, $C_s$) | 82 nF |
| Primary/Secondary self inductance ($L_{pos}$, $L_s$) | 38.3 μH |
| AC Input voltage ($V_{ac}$) | 120 V |
| Input AC frequency ($f_{ac}$) | 60 Hz |
| IPT designed resonance frequency ($f_r$) | 90 kHz |

FIG. 17

Algorithm 1 Signal Synthesis Based on $\overline{sign(i_r)}$

1: procedure
2:  if rising_edge($clk_{sys}$) then
3:   count0 <== count0 + 1
4:  end if
5:  count22(0) ==> count0(0) and $clk_{sys}$
6:  count22(1) ==> count0(1) and $clk_{sys}$
7:  count22(2) ==> count0(2) and $clk_{sys}$
8:  count22(3) ==> count0(3) and $clk_{sys}$
9: end procedure

FIG. 18

Algorithm 2 Signal Synthesis Based on $sign(i_r)$

1: procedure
2:  if rising_edge($clk_{sys}$) then
3:   count1 <== count1 + 1
4:  end if
5:  count33(0) ==> count1(0) and $clk_{sys}$
6:  count33(1) ==> count1(1) and $clk_{sys}$
7:  count33(2) ==> count1(2) and $clk_{sys}$
8:  count33(3) ==> count1(3) and $clk_{sys}$
9: end procedure

FIG. 19

Algorithm 3 Boolean relations to build multi-level signal (varying level from 1 to 16) for negative half cycle of clock 1: procedure
2:  count44(0) <== ¬(count22(3) and count22(2) and count22(1) and count22(0)); → 1 pulses
3:  count44(1) <== (count22(3) and count22(2) and count22(0)); → two pulses
4:  count44(2) <== (count22(3) and count22(2) and count22(0)) or (count22(3) and count22(2) and count22(0)); → three pulses
5:  count44(3) <== (count22(3) and count22(2)); → four pulses
6:  count44(4) <== (count22(3) or (count22(3)) and (count22(3) and count22(0)); → five pulses
7:  count44(5) <== (count22(3) and count22(2)) or (count22(3) and count22(2)); → six pulses
8:  count44(6) <== (count22(3)) or (count22(3) and count22(2)) or (count22(3) and count22(0)); → seven pulses
9:  count44(7) <== count22(3); → eight pulses
10: count44(8) <== count22(3) and count22(2); → nine pulses
11: count44(9) <== count22(3) or (count22(2) and count22(1)); → ten pulses
12: count44(10) <== count22(3) or (count22(2)) and count22(0); → eleven pulses
13: count44(11) <== count22(3) or count22(2); → twelve pulses
14: count44(12) <== count22(3) or count22(2) or (count22(0)) and count22(2); → thirteen pulses
15: count44(13) <== count22(3) or count22(2) or count22(1); → fourteen pulses
16: count44(14) <== count22(3) or count22(2) or count22(0); → fifteen pulses
17: count44(15) <== not clk_ax; → sixteen pulses
18: end procedure

FIG. 20

Algorithm 4 Boolean relations to build multi-level signal (varying level from 1 to 16) for Positive half cycle of clock 1: procedure
2:  count5(0) <= (count33(3) and count33(2) and count33(1) and count33(0)); → 1 pulses
3:  count5(1) <= (count33(3) and count33(2) and count33(1)); → two pulses
4:  count5(2) <= (count33(3) and count33(2) and count33(1)) or (count33(3) and count33(2) and count33(0)); → three pulses
5:  count5(3) <= (count33(3) and count33(2)); → four pulses
6:  count5(4) <= (count33(3) and count33(2)) or (count33(3) and count33(1) and count33(0)); → five pulses
7:  count5(5) <= (count33(3) and count33(2)) or (count33(3)) ; → six pulses
    count33(1)); → six pulses
8:  count5(6) <= (count33(3) and count33(2) or (count33(3) and count33(1)) or (count33(3) and count33(0)) ; → seven pulses
9:  count5(7) <= (count33(3)); → eight pulses
10: count4(8) <= count22(3) or (count22(2) and count22(1) and count22(0) ) ; → nine pulses
11: count5(9) <= count33(3) or (count33(2) and count33(1)); → ten pulses
12: count5(10) <= count33(3) or (count33(2) and count33(1)) or count33(2) and count33(0)); → eleven pulses
13: count5(11) <= count33(3) or count33(2); → twelve pulses
14: count5(12) <= count33(3) or count33(2) or (count33(0) and count33(1) ; → thirteen pulses
15: count5(13) <= count33(3) or count33(2) or count33(1); → fourteen pulses
16: count5(14) <= count33(3) or count33(2) or count33(1) ; → fifteen pulses
    count33(0); → fifteen pulses
17: count5(15) <= clk_or; → sixteen pulses
18: end procedure

FIG. 21

SYSTEMS AND METHODS FOR PROVIDING INDUCTIVE POWER TRANSFER POWER CONTROL

CROSS-REFERENCE TO RELATED APPLICATION

This application claims the benefit of U.S. Provisional Application Ser. No. 63/264,696, filed Nov. 30, 2021, the disclosure of which is hereby incorporated by reference in its entirely, including all figures, tables, and drawings.

GOVERNMENT SUPPORT

This invention was made with government support under 1541108 awarded by the National Science Foundation (NSF). The government has certain rights in the invention.

BACKGROUND

Inductive electric vehicle (EV) charging has recently found an increasing interest for increasing reliance on electric-based transportation systems. Based on United States (U.S.) transportation statistics, 55 percent of new automobile sales will be EVs by 2040. Also, according to U.S. car sales data, the average number of annual total EVs sold increased 82% year over year, which shows national interest in increasing reliance on electric-based transportation systems. On the other hand, this will significantly change the load profile on the electric grid and impact the grid dynamic by increasing both voltage and frequency fluctuations. The increased number of grid-to-vehicle (G2V) connections with varying demand can introduce stability issues. Inductive power transfer (IPT) systems have garnered attention recently for charging applications including EVs, scooters, electric aircraft, wheelchair, and the like. This emerging technology has become marketable by different automobile manufacturers, which shows the pace of its advancement and progress.

BRIEF SUMMARY

Embodiments of the subject invention provide novel and advantageous power controllers (e.g., inductive power transfer (IPT) power controllers), as well as methods of making and using the same. An IPT power controller can be implemented on alternating current (AC)-AC converters and can use only current and voltage measurements to produce multi-power level IPT controller and design switching logic. Using Boolean operators (e.g., AND, OR, Not) applied on a resonant current signal, varying positive energy injections (e.g., 1 to 16 pulses), and varying negative energy injections (e.g., 1 to 16 pulses), up to 32 different active states can be designed. The synchronization of the converter's switching with the IPT system's resonant frequency can allow the soft switching condition (both zero current switching (ZCS) and zero voltage switching (ZVS)) to be met, resulting in a highly efficient converter. The controller can be programmed in field-programmable gate array (FPGA)-based hardware.

In an embodiment, an IPT power controller can comprise: a first capacitor; a first inductor in series with the first capacitor; a second inductor in operable communication with the first inductor; a second capacitor in series with the second inductor; a connection configured to be connected to a converter, the connection being in operable communication with the first capacitor; a processor (e.g., in operable communication with one or more of the foregoing elements); and a (non-transitory) machine-readable medium (e.g., a (non-transitory) computer-readable medium) in operable communication with the processor and having instructions stored thereon that, when executed by the processor, perform at least one algorithm that uses Boolean operators to vary positive energy injections and negative energy injections to give a plurality of discrete charging levels of the IPT power controller. The plurality of discrete charging levels can comprise at least 32 discrete charging levels (e.g., exactly 32 discrete charging levels). The at least one algorithm can comprise a first algorithm that varies positive energy injections and a second algorithm that varies negative energy injections. The first algorithm can vary positive energy injections over a range of from 1 to 16 pulses, and/or the second algorithm can vary negative energy injections over a range of from 1 to 16 pulses. The IPT power controller can be configured to synchronize a resonant frequency of the IPT power controller with a switching of the converter to allow ZCS and/or ZVS. The IPT power controller can be implemented on, for example, an FPGA.

In a further embodiment, an electric charging system can comprise an IPT power controller as described herein and an AC-AC matrix converter connected to the IPT power controller. The AC-AC matrix converter can comprise a primary full bridge inverter that comprises four switches. The AC-AC matrix converter can be configured to convert from an input frequency of 60 Hertz (Hz) to a resonant frequency of at least 1 kilohertz (kHz) (e.g., a resonant frequency on the order of tens or even hundreds of kHz). The electric charging system can further comprise a gate drive circuit, a peak detector circuit, and/or at least one sign circuit. The electric charging system can be implemented on, for example, a printed circuit board (PCB).

In another embodiment, a method of providing IPT power control can comprise: providing an IPT power controller (which can comprise a first capacitor, a first inductor in series with the first capacitor, a second inductor in operable communication with the first inductor, a second capacitor in series with the second inductor, and a connection configured to be connected to a converter, the connection being in operable communication with the first capacitor); connecting an AC-AC matrix converter to the connection of the IPT power controller; and performing at least one algorithm that uses Boolean operators to vary positive energy injections and negative energy injections to give a plurality of discrete charging levels of the IPT power controller. The plurality of discrete charging levels can comprise at least 32 discrete charging levels. The at least one algorithm can comprise a first algorithm that varies positive energy injections and a second algorithm that varies negative energy injections. The first algorithm can vary positive energy injections over a range of from 1 to 16 pulses, and/or the second algorithm can vary negative energy injections over a range of from 1 to 16 pulses. The method can further comprise synchronizing a resonant frequency of the IPT power controller with a switching of the AC-AC matrix converter to allow ZCS and/or ZVS. The IPT power controller can be implemented on, e.g., an FPGA.

BRIEF DESCRIPTION OF DRAWINGS

FIG. 16 shows a table of switching states based on signed voltage and signed current signals, and zero active modes.

FIG. 17 shows a table of technical specifications for an IPT system setup, according to an embodiment of the subject invention. In FIG. 17, mm stands for millimeters, nF stands for nanoFarads, μH stands for microHenry, V stands for Volts, Hz stands for Hertz, and kHz stands for kilohertz.

FIG. 18 shows an algorithm for signal synthesis based on sign($i_r$)[bar].

FIG. 19 shows an algorithm for signal synthesis based on sign($i_r$).

FIG. 20 shows an algorithm for Boolean relations to build multi-level signal (varying from 1 to 16) for negative half cycle of clock.

FIG. 21 shows an algorithm for Boolean relations to build multi-level signal (varying from 1 to 16) for positive half cycle of clock.

DETAILED DESCRIPTION

Figure 1:
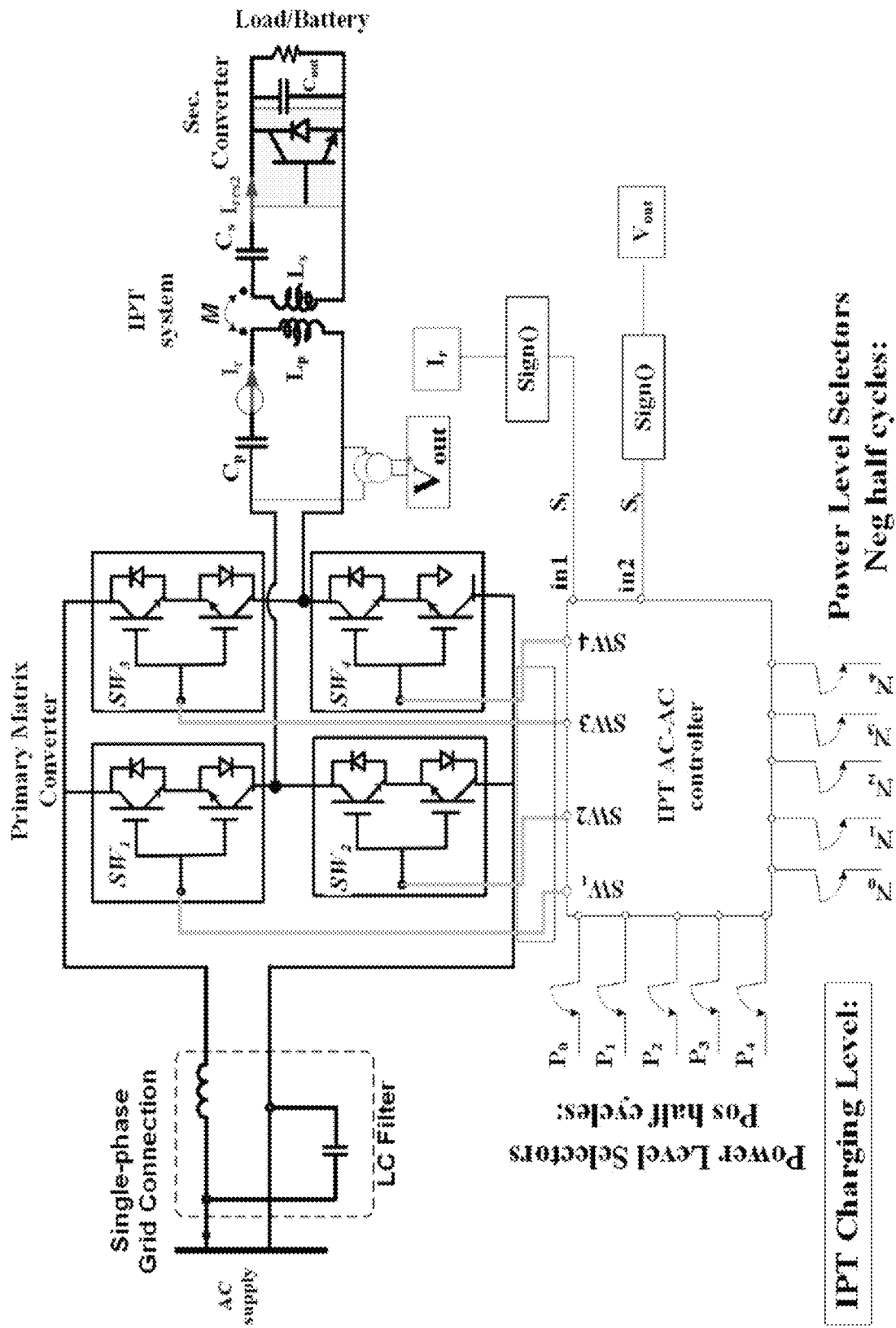
FIG. 1 shows an alternating current (AC)-AC matrix converter and inductive power transfer (IPT) system.

Embodiments of the subject invention provide novel and advantageous power controllers (e.g., inductive power transfer (IPT) power controllers), as well as methods of making and using the same. An IPT power controller can be implemented on alternating current (AC)-AC converters and can use only current and voltage measurements to produce multi-power level IPT controller and design switching logic. Using Boolean operators (e.g., AND, OR, Not) applied on a resonant current signal, varying positive energy injections (e.g., 1 to 16 pulses), and varying negative energy injections (e.g., 1 to 16 pulses), up to 32 different active states can be designed. The synchronization of the converter's switching with the IPT system's resonant frequency can allow the soft switching condition (both zero current switching (ZCS) and zero voltage switching (ZVS)) to be met, resulting in a highly efficient converter. The controller can be programmed in field-programmable gate array (FPGA)-based hardware.

Embodiments can provide virtual inertia-based control of inductive electric vehicle charging systems. The controller can enable inductive charging systems to effectively respond to grid frequency fluctuations and thereby contribute to power grid stabilization by providing virtual inertia. The multi-power level IPT resonant controller can realize virtual inertia control in IPT systems. The virtual inertia-based multi-power transfer level controller can regulate the number of quantum energy-injection pulses according to the power grid frequency change. A frequency power model and/or a multi-power level controller designed for IPT systems can be used to synchronize the IPT system with power grid dynamics and achieve virtual inertia. The virtual inertia controller can tune the proper inductive charging power level based on grid frequency fluctuations. This enables the IPT system to perform as a controllable load that can be varied from the least load level (e.g., level 1) to full load level (e.g., level 16). In other words, when the grid frequency rises, the virtual inertia-based control can increase the IPT's power transfer level, and the other way around, which can therefore contribute to electric grid dynamic enhancement. The controller can advantageously provide high grid-to-battery efficiency (e.g., up to 89.45% or more) due to ZCS and ZVS being employed. Also, owing to the simplicity of the multi-power transfer level controller design, its implementation on IPT systems is not complicated.

Controllers of embodiments of the subject invention have easy-to-implement designs, regulate an inductive electric vehicle charging level (e.g., in 16 different power levels) based on the electric grid dynamics (which contributes to electric grid dynamic improvement), and have high efficiency due to soft switching technique used for power electronics.

Most of the advancements in IPT systems have been carried out on its power transfer controller and switching logic improvement. A multi-power level converter that can change the IPT power level for different applications from units of kilowatts (kW) (such as scooter, wheelchairs, and the like) to tens of kW (such as EV) would be highly beneficial. As an example, users may want to get their different devices charged using only one wireless charging system, and this highlights the importance of having a user-friendly adjustable IPT charging level controller. Due to the inherent dynamics of IPT systems, the constant power delivery to the secondary coupler is hard to achieve unless an adaptive IPT power controller is used. Some of the inherent dynamics of IPT system include misalignment and load variation, which can cause the IPT system to run in off-tuned condition leading to reduction in efficiency and power transfer capacity. Specially, for inductive EV chargers in dynamic operation (in motion), frequent misalignment experience is unavoidable, as with an EV moving across an IPT track comprised of array of multiple lumped couplers, leading to extreme coupling factor variation. In order to make up the load variation, different compensation topologies have been introduced in different investigations including double-sided LCC, double-sided LCL, LC/S, S/LCC, S/CLC, and S/SP. These topologies resulted in improving the misalignment tolerance performance of the IPT system. Some other researches have proposed impedance network matching to maximize the power transfer rate. In, the impedance matching network in the secondary side was presented using the phase shift control, which is applied in the secondary side converter. Recent studies are geared toward self-tuned multi-power level IPT controllers. This allows the IPT system to adjust its power level in order to make up for the power dips during misalignment conditions. The self-tuned capability in these works is realized through the resonant frequency tracking design. However, in order to effectively regulate the power levels of the IPT systems, there's a need to develop simplified power level control algorithms that accurately track the control parameters and correspondingly regulate the gate signals of the switches. Embodiments of the subject invention address this need.

Among many digital controllers, FPGAs offer ease of hardware reconfigurability, fast and dynamic modification of the design, cheaper hardware, and software customization. FPGAs (due to the parallel processing capabilities) are capable of achieving faster execution time, which is one of the drawbacks of micro-controllers or digital signal processor (DSP) digital controllers. They are capable of being used at very high switching frequencies, thereby having high control bandwidth. These features make FPGAs well suited for high switching frequency IPT systems.

In an embodiment, a 32-level IPT power controller can be used and can be synthesizable in hardware description language (HDL) platforms (FPGAs) for direct AC-AC matrix converters. Using the controller, the IPT charging level can be varied from 1 to 32 levels. The design control has high simplicity, requires only two sensor measurements, and provides soft switching (ZCS and ZVS). The entire design process in FPGA can be done using very high speed integrated circuits HDL (VHDL), and can be verified using for example simulation results (e.g., Modelsim simulation results).

FIG. 1 shows an AC-AC matrix converter and IPT system, according to an embodiment of the subject invention. IPT systems for bidirectional operation require two series common-source switches in each module ($SW_{i=1:4}$) as shown in FIG. 1. The shown topology can be connected to the main grid without any need for direct current (DC) conversion or a DC interface, reducing the cost as well as increasing the reliability of the IPT charging system. As shown in FIG. 1, only measurements of the primary resonant current ($I_r$) and the main AC voltage ($V_{AC}$) are required. The Sign function is applied on measurement signals, which results in $S_v$=Sign($V_{AC}$) and $S_i$=Sign($I_r$) and inputted into the IPT power controller (in this case FPGA digital platform). The matrix converter directly converts from AC 60 Hertz (Hz) into high resonant frequency using a primary full bridge inverter. The IPT power controller can be discussed in terms of multi-power level resonant frequency-based power controller design and switching logic design.

Resonant Frequency-Based Power Controller Design

The controller can be designed to adjust the charging level of the IPT system over the control frequency, which is considered sixteen times of the IPT resonant frequency ($f_{ctr}$=16×$f_{res}$). As can be seen from FIG. 1, using the four dip switches for negative half cycles ($N_i$), the frequency of $S_i$ can be divided down by k/16 factors (k=1, 2, . . . , 16). On the other hand, the four dip switches for positive half cycles ($P_i$) are defined as bits to divide the frequency of the signed resonant current ($S_i$) in positive half cycles. In the digital controller, $S_i$ can be defined the same as $clk_{in}$ (discussed later herein).

Figure 2:
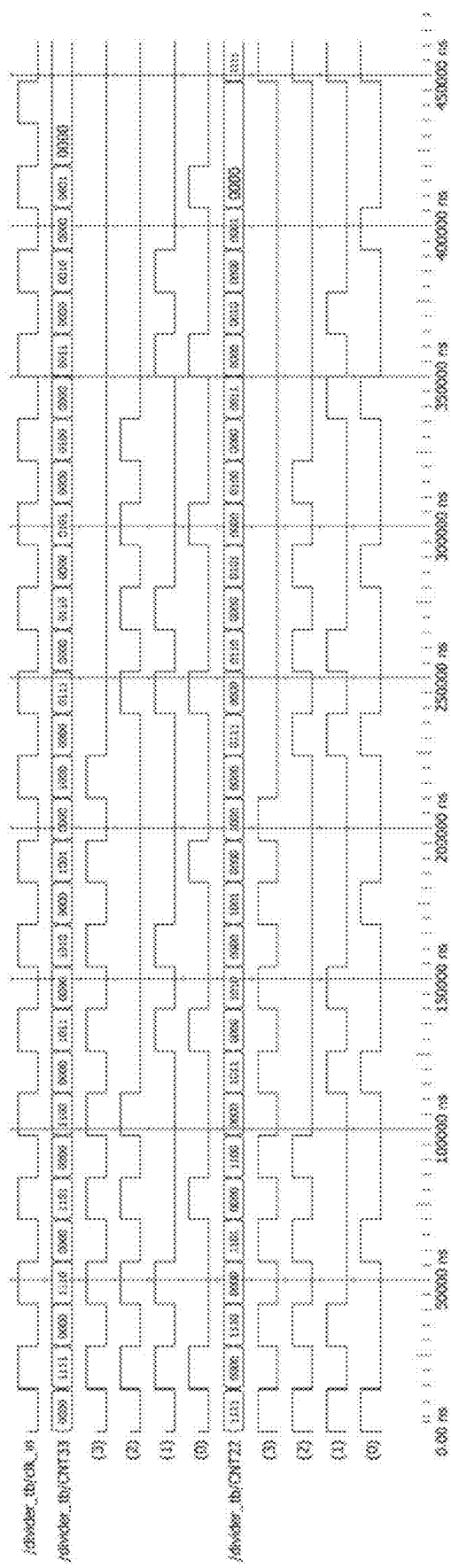
FIG. 2 shows simulation results for signals count2(i), count22, count3, and count33.

The algorithms 1 and 2 shown in FIGS. 18 and 19, respectively, are written in VHDL script version, where count2(i), count22(i), count3(i), and count33 are signals with size of 4-bit length that are synthesized using $clk_{in}$, $clkn_{in}$[bar], count0, count0[bar], count1 and count1[bar] ($\forall i\in[0\ldots3]$), where $clk_{in}$, $count_0$, and $count_1$ are the sign of resonant current, count number of negative half cycles, and count number of positive half cycles, respectively. The simulation can be carried out using a simulation program (e.g., Modelsim and/or Quartus Prime Lite Edition), and the resulting simulated signals (as carried out using Modelsim and Quartus Prime Lite Edition) are shown in FIG. 2.

Figure 3:
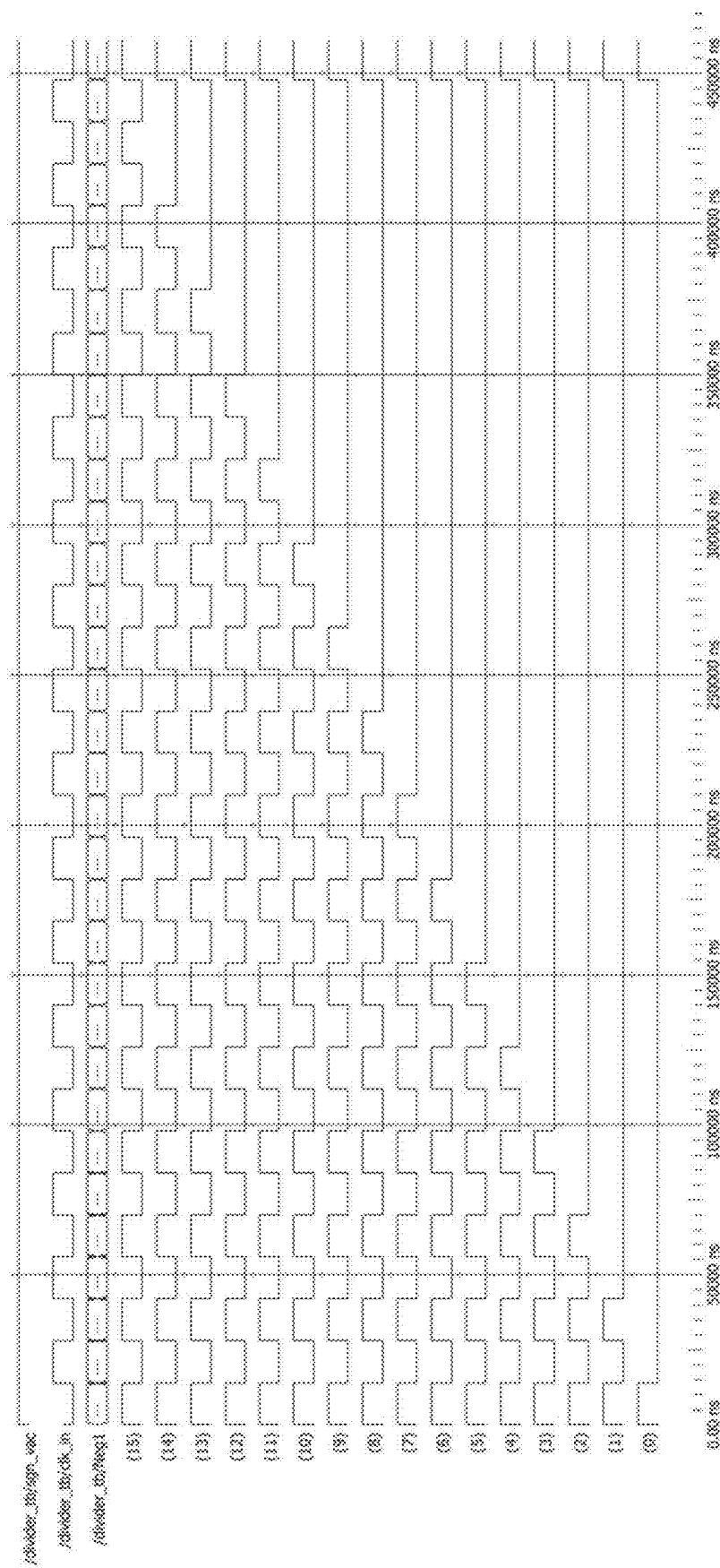
FIG. 3 shows simulation results for signal count4(t) (∀t∈[0 ... 15]), which contains t+1 pulses in negative half cycles.
Figure 4:
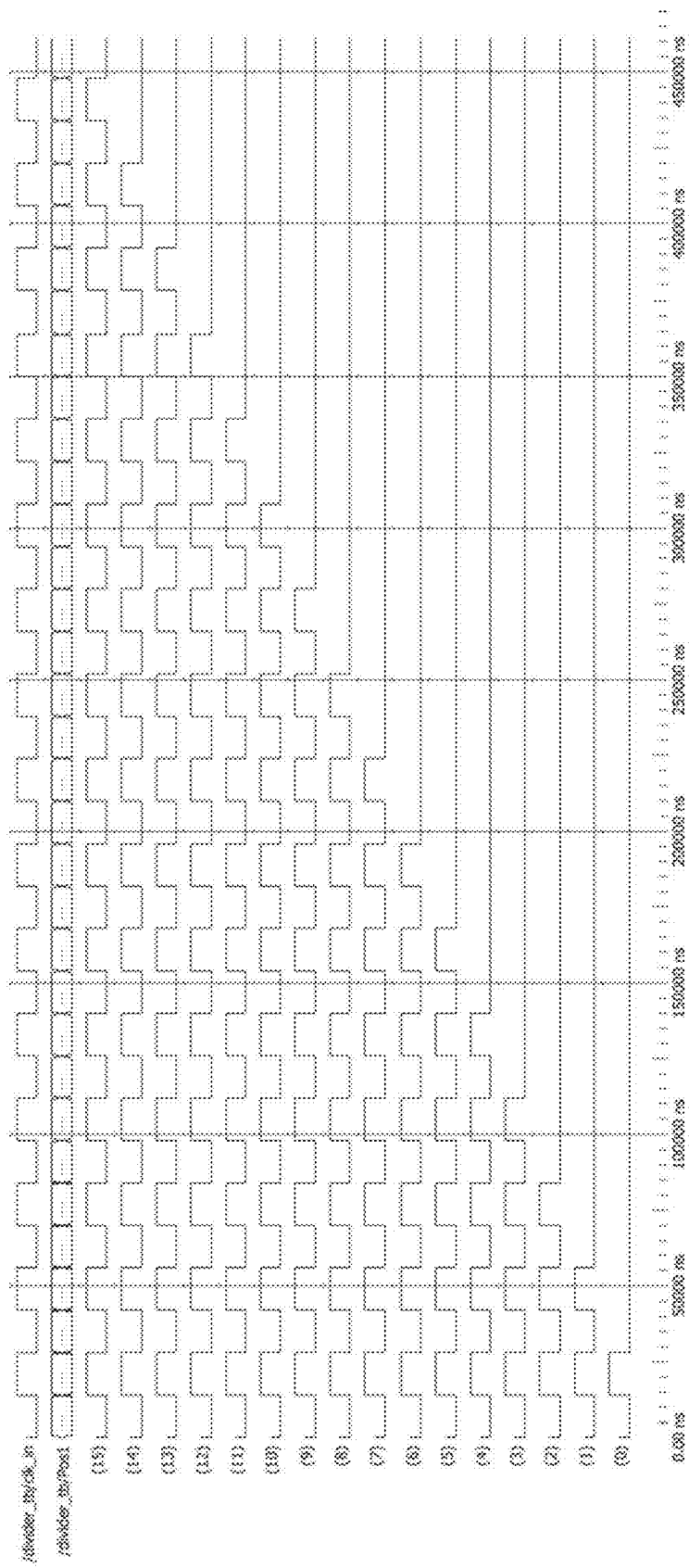
FIG. 4 shows simulation results for signal count5(k) (k=0 to 15), which contains the (k+1) pulses in positive half cycles.

As shown in the algorithms 3 and 4 in FIGS. 20 and 21, respectively, signals count4(t) and count5(k) ($\forall t, k \in [0 \ldots 15]$) are synthesized in such a way that extract $L_{neg}$=t+1 and $L_{pos}$=k+1 number of pulses in either positive or negative half cycles. As can be seen from FIGS. 3 and 4, count4(t) and count5(k) are 16-bit length signals that contain varying pulse number from 1 to 16 pulses in either negative half cycles of CLK or positive half cycles. As an example, count4(6) and count5(6) keep 7 pulses out of the entire 16 pulses in $clk_{in}$ and $clk_{in}$[bar], respectively, and eliminate the remaining pulses as illustrated in FIGS. 3 and 4, respectively.

Switching Logic

Figure 5:
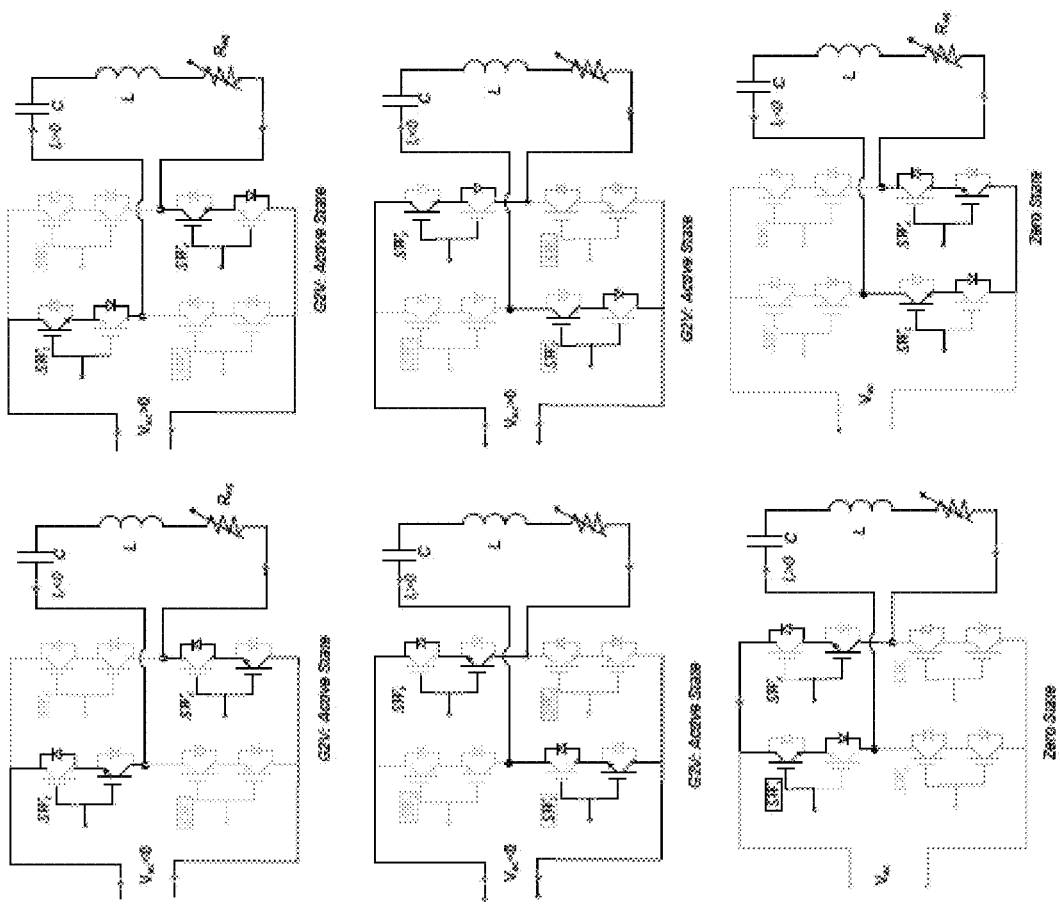
FIG. 5 shows equivalent circuit operations with active and zero states for grid to vehicle operational mode.

The switching logic is set to allow power flow from the grid to the vehicle ($S_{inj}$). As can be seen in the table in FIG. 16, there are six possible operation modes; among them, four are power injection modes and two are zero injection (free oscillation) modes. Power flow direction in the four energy injections is set to be from grid to vehicle (G2V). Therefore, the output voltage and resonant current signs will be same (both signs will always be either positive or negative). As can be seen from FIG. 16 and FIG. 5, when the voltage is positive and the current sign is high, or when the voltage is negative and the current sign in low, the switches SW1 and SW4 conduct, and the switching gate signals of SW1 and SW4 are assigned on either count5(k) or count4(t) signals, respectively. The charging level in positive half cycles ($L_{pos}$) and negative half cycles ($L_{neg}$) are specified based on values of dip switches $P_i$ and $N_i$, which are defined as the power level selectors in the FPGA pinout.

When the voltage is negative and the current is in its positive half cycle or when the voltage is positive and the current sign is negative, then the switches SW2 and SW3 conduct, and the switches SW1 and SW4 may conduct, and the switching gate signals of SW2 and SW3 depending on the resonant current direction are assigned on either count5 (k) or count4(t) signals, respectively. However, in zero switching states, the converter output voltage is set to zero (shorted). This means that, in positive half cycles upper switches (SW1 and SW3) conduct and for negative half cycles bottom switches (SW2 and SW4) conduct; and the switching gate signals depending on the resonant current direction are assigned on either CLK or CLK[bar] signals, respectively.

In order to calculate the power transfer rates in different mentioned levels, a fundamental harmonic approximation (FHA) method is used. Applying the FHA method, the fundamental component of the converter's voltage is derived at the resonance frequency ω as follows:

$$V_{Conv}^1 = \frac{\omega}{16\pi} \int_0^{\frac{32\pi}{\omega}} V_{Conv}^{out} \sin(\omega t) dt \quad (1)$$

where $V_{conv}^{out}$ is the output voltage of the primary AC/AC converter, ω is the resonance frequency, and $V_{conv}^{-1}$ is the converter's fundamental harmonic component. Considering $L_{pos}$ and $L_{neg}$ as energy injection signals in negative and positive half-cycles of resonant current, respectively, the output voltage can be rewritten in a discrete way as shown in Equations (2) and (3) when either input AC voltage is in positive or negative half cycles:

$$V_{Conv}^{out} = \begin{cases} +V_{AC} & \frac{2(j-1)\pi}{\omega} < t < \frac{(2j-1)\pi}{\omega}, j=1,\ldots,L_P \\ -V_{AC} & \frac{(2i-1)\pi}{\omega} < t < \frac{2i\pi}{\omega}, j=1,\ldots,L_N \\ & V_{AC} > 0 \\ 0 & \text{otherwise} \end{cases} \quad (2)$$

$$V_{Conv}^{out} = \begin{cases} -V_{AC} & \frac{2(j-1)\pi}{\omega} < t < \frac{(2j-1)\pi}{\omega}, j=1,\ldots,L_P \\ +V_{AC} & \frac{(2i-1)\pi}{\omega} < t < \frac{2i\pi}{\omega}, j=1,\ldots,L_N \\ & V_{AC} < 0 \\ 0 & \text{otherwise} \end{cases} \quad (3)$$

where $V_{AC}$ is the input AC supply voltage, the $L_{pos}$ and $L_{neg}$ denote the energy injection pulse number in resonant current's positive or negative half cycle, and the converter's output voltage $V_{AC}$ are in all these active states. Because the resonant frequency ($f_{res}$) is much higher than the frequency of the input AC voltage ($f_{res}$ (90 kHz)>$f_{AC}$ (60 Hz)), the input voltage magnitude ($V_{AC}$) over the control frequency ($f_{ctr}=16\times f_{res}$) can be considered constant. This means assuming the constant magnitude of input AC voltage in the first and second terms of Equations (2) and (3) is correct. Calculation of converter output voltage over the control frequency can be achieved based on either Equation (2) or Equation (3), and both give the same formulation. Equation (2) is used here for demonstrative purposes only. As the third term of Equations (2) and (3), the resonant converter operates in zero state, which means that the IPT operates in free-oscillation mode. By substituting Equation (2) in Equation (1) and expanding it, Equation (4) can be achieved:

$$V_{Conv}^1 = \frac{\omega}{16\pi}\left(\sum_{j=1}^{L_{pos}} \int_{\frac{2(j-1)\pi}{\omega}}^{\frac{(2j-1)\pi}{\omega}} V_{AC}\sin(\omega t)dt + \sum_{i=1}^{L_{neg}} \int_{\frac{(2i-1)\pi}{\omega}}^{\frac{2i\pi}{\omega}} -V_{AC}\sin(\omega t)dt \right) \quad (4)$$

Equation (4) can be simplified to Equation (5) as follows:

$$V_{Conv}^1 = \frac{(L_{pos}+L_{neg})V_{AC}}{8\pi} \quad (5)$$

As defined earlier, $D=(L_{pos}+L_{neg})/32$ can be substituted in Equation (5) and simplified as expressed in Equation (6).

$$V_{Conv}^1 = \frac{4}{\pi}DV_{AC} \quad (6)$$

In order to calculate power transfer rate for this system, the fundamental harmonic of primary resonant current is calculated using Equation (5) and expressed in Equation (7):

$$I_{pr} = \frac{V_{Conv}^1}{R_{eq}} = \frac{(L_{pos}+L_{neg})V_{AC}}{4\pi R_{eq}} \quad (7)$$

where $R_{eq}$ (shown in FIG. 5) is the equivalent resistance reflected to the primary, because at resonant frequency, the secondary series compensation capacitor and secondary inductance cancel each other out. Then, the output power can be presented as, $$P = \frac{1}{2}R_{eq}I_{pr}^2 = \frac{(L_{pos}+L_{neg})^2 V_{AC}^2}{32\pi^2 R_{eq}} \quad (8)$$

As can be seen from Equation (8), the $L_{neg}$ and $L_{pos}$ as the energy injection pulses have direct relation to power transfer rate. As can be seen from the three-dimensional (3D) plot shown in FIG. 8, the output power is at its maximum when the total energy injection is 32 ($L_{pos}$=16 and $L_{neg}$=16). Additionally, the power transfer is also dependent on the load, and can be varied with load change. This means the adjustable charging level can be of great functionality to keep the power transfer rate fixed under load variation.

Figure 6:
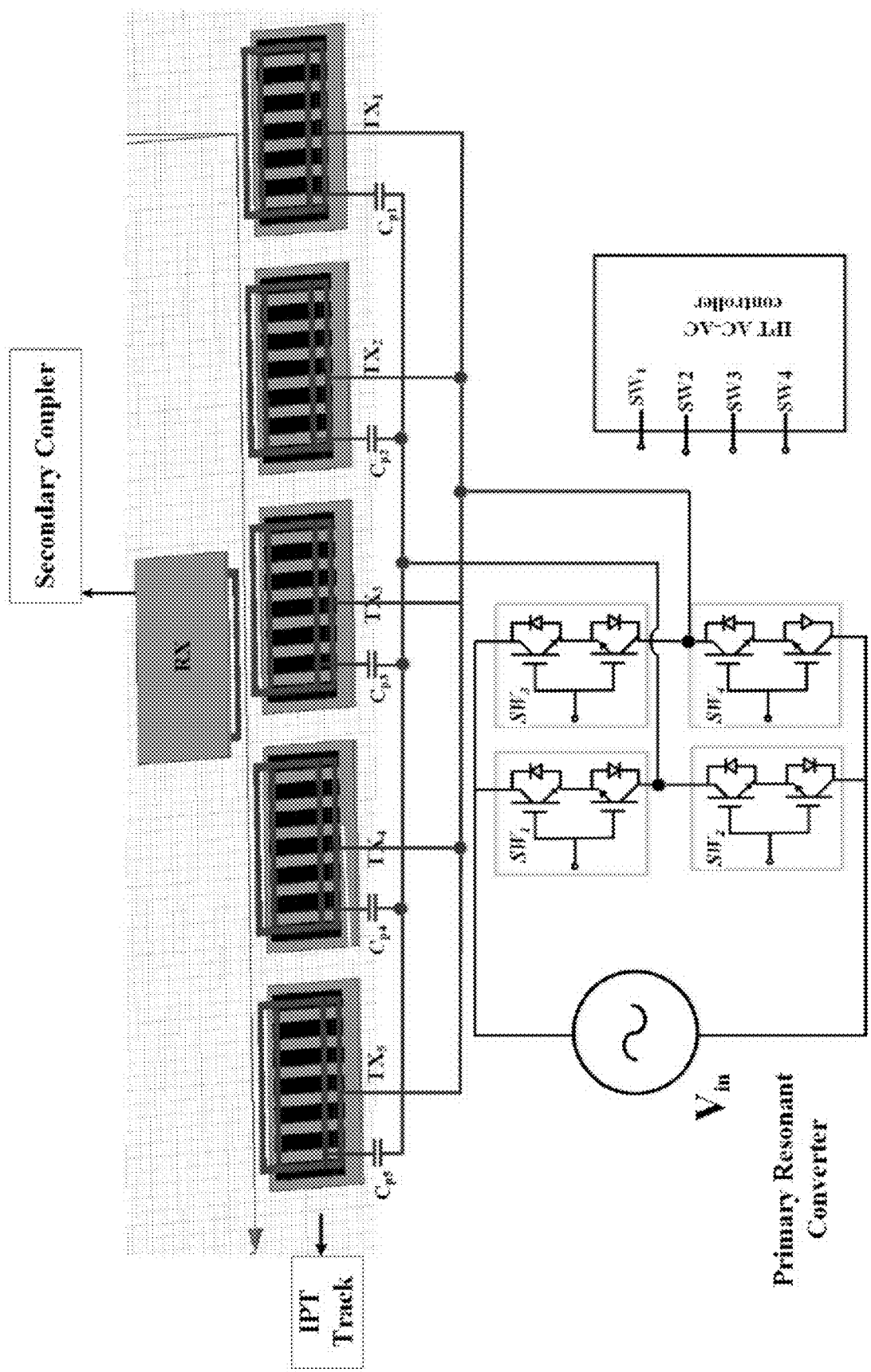
FIG. 6 shows an image of a dynamic IPT setup including five bipolar transmitting couplers and a receiver, according to an embodiment of the subject invention.
Figure 7:
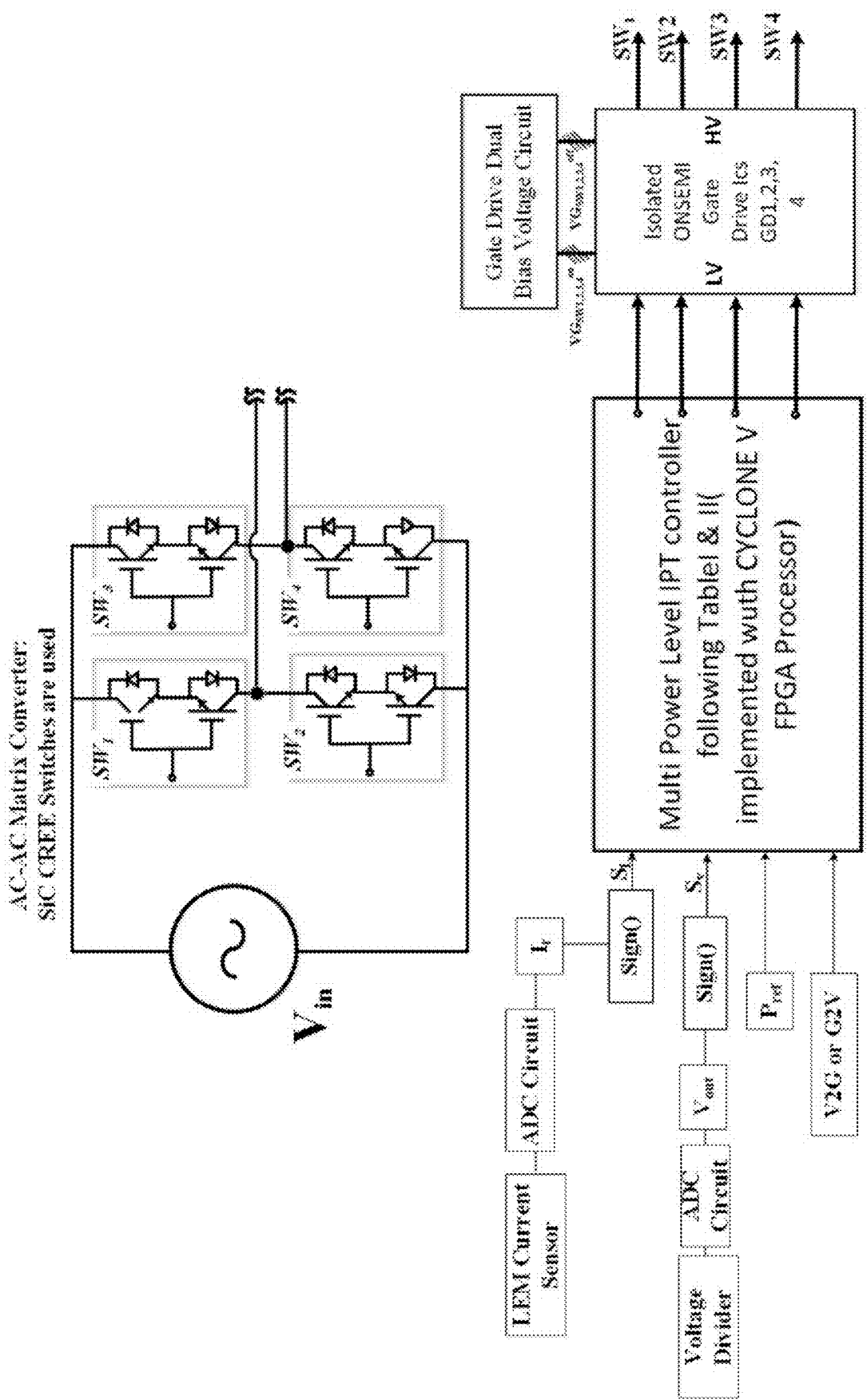
FIG. 7 shows an image of a resonant high frequency converter with a field-programmable gate array (FPGA)-based IPT power controller, according to an embodiment of the subject invention.

The setup of embodiments of the subject invention can also be equipped with two different DC motors that can move the secondary all across the IPT track; and a further DC motor can be installed in the receiver side and can produce a lateral misalignment system (referring to FIG. 6). As shown using labels in FIG. 7, the printed circuit board (PCB) can include an AC-AC high frequency converter, an FPGA-based IPT power controller, a gate drive circuit, a peak detector circuit, and sign()circuits. Experimental results have been achieved for different values of power selectors ($N_i$ and $P_i$), which in total can adjust from 0 (no charge mode) to 32 (full charging level), to verify the power regulation capability of the IPT power level controller.

Figure 9A:
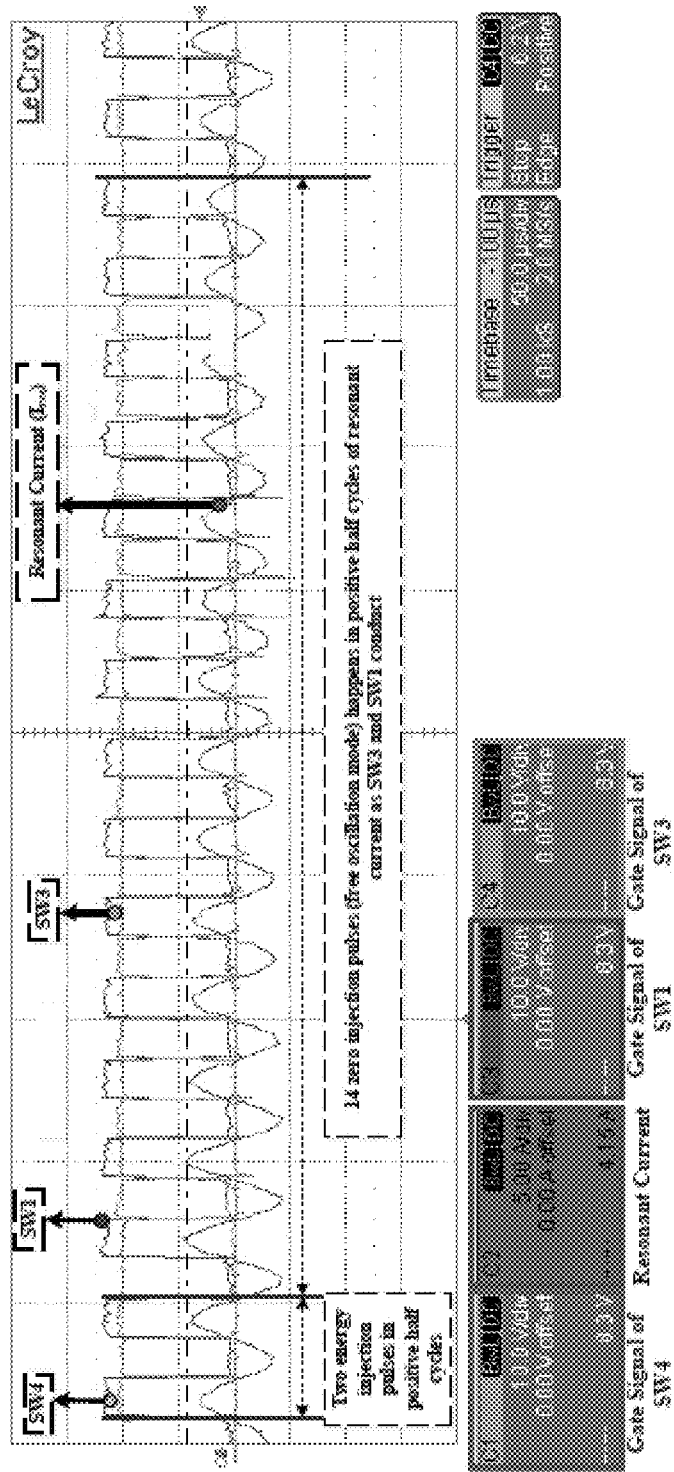
FIGS. 9A and 9B show switching signals when the multi-power level controller is set to operate in a total level of 5 ($L_{neg}$=3 and $L_{pos}$=2), with FIG. 9A showing dip switches for power level selector for positive set as $P_3P_2P_1P_0$="0001" and FIG. 9B showing dip switches for power level selector for negative set as $N_3N_2N_1N_0$="0010".
Figure 9B:
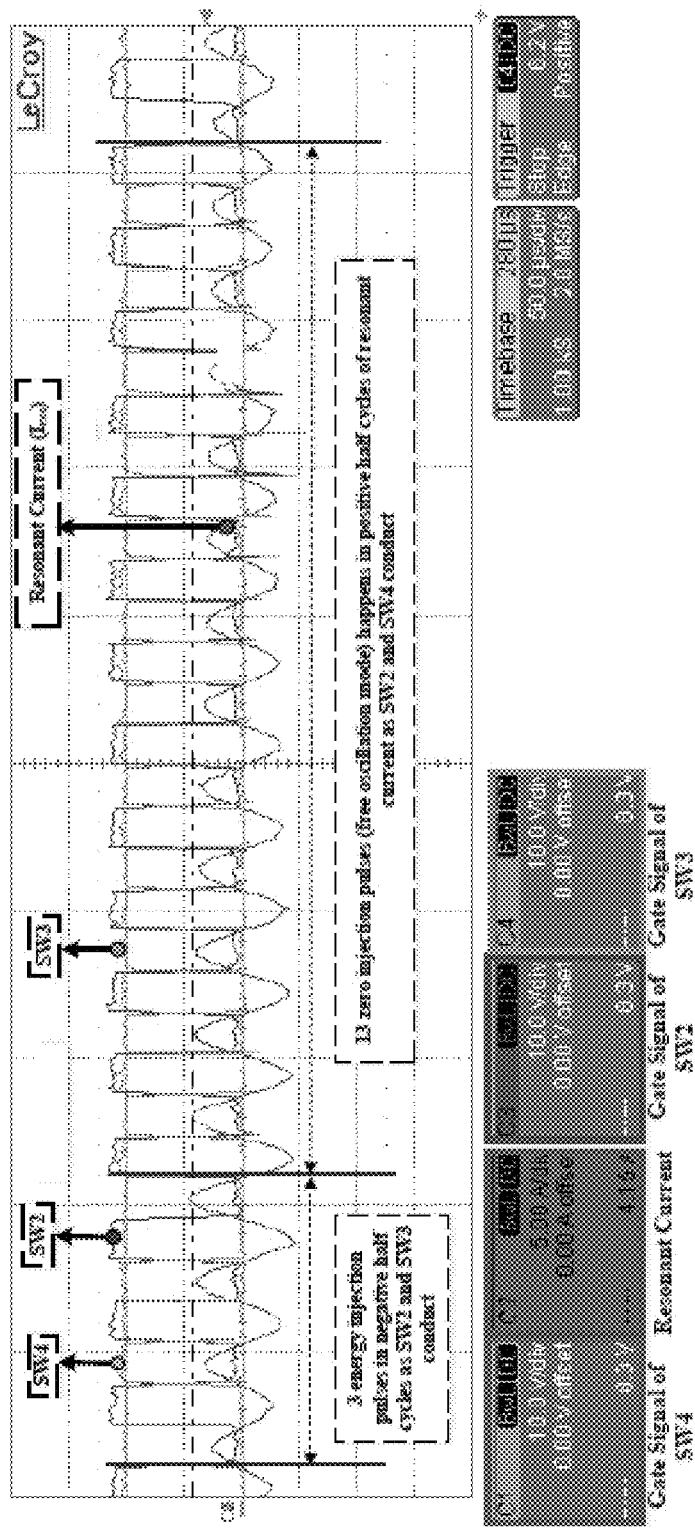

In FIGS. 9A and 9B, the IPT charging level is set at 5 by considering 3 energy injections in negative half cycles, and 2 energy injections in positive half cycles ($L_{neg}$=3 and $L_{pos}$=2). The dip switches defined as power level selectors are set as follows: $P_3P_2P_1P_0$="0001" and $N_3N_2N_1N_0$="0010". Referring to FIG. 9A, two energy injections occur during positive half cycles; accordingly, switches SW1 and SW4 conduct, while in the remaining 14 half cycles of the control frequency ($f_{ctr}=16\times f_{res}$), the free-oscillation (non-injection) occurs and switches SW1 and SW3 conduct. Referring to FIG. 9B, three energy injections occur during negative half cycles, with switches SW2 and SW3 conducting, and 13 free-oscillations (non-injection) occur during the remaining half cycles of control frequency, with switches SW2 and SW4 conducting. It is evident from FIGS. 9A and 9B that during energy injection time intervals, the resonant current magnitude increases and reaches up to the peak value of 4.15 Amps (A) and during the zero injection time interval, the current magnitude starts decreasing.

Figure 10A:
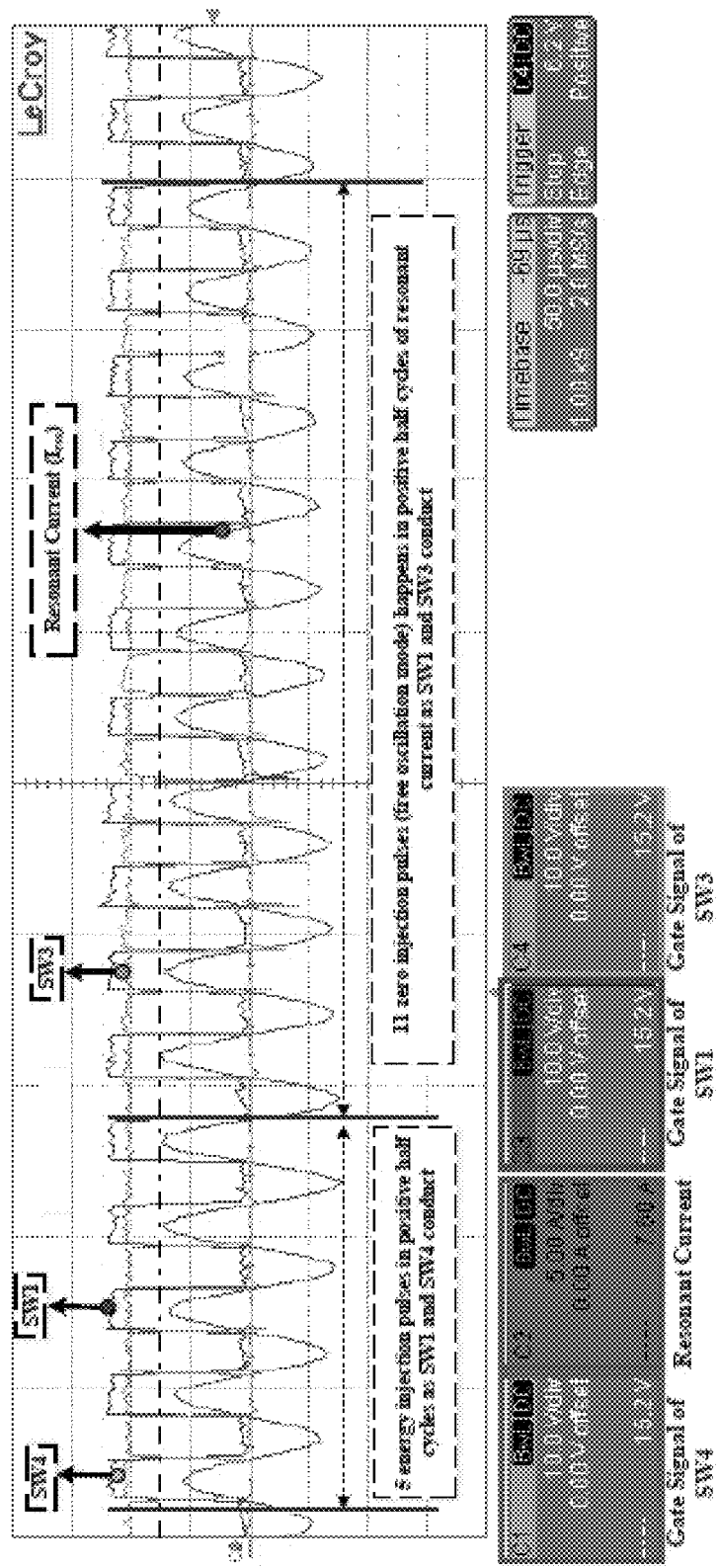
FIGS. 10A and 10B show switching signals when the multi-power level controller is set to operate in a total level of 9 ($L_{neg}$=5 and $L_{pos}$=4), with FIG. 10A showing dip switches for power level selector for positive set as $P_3P_2P_1P_0$="0101" and FIG. 10B showing dip switches for power level selector for negative set as $N_3N_2N_1N_0$="0100".
Figure 10B:
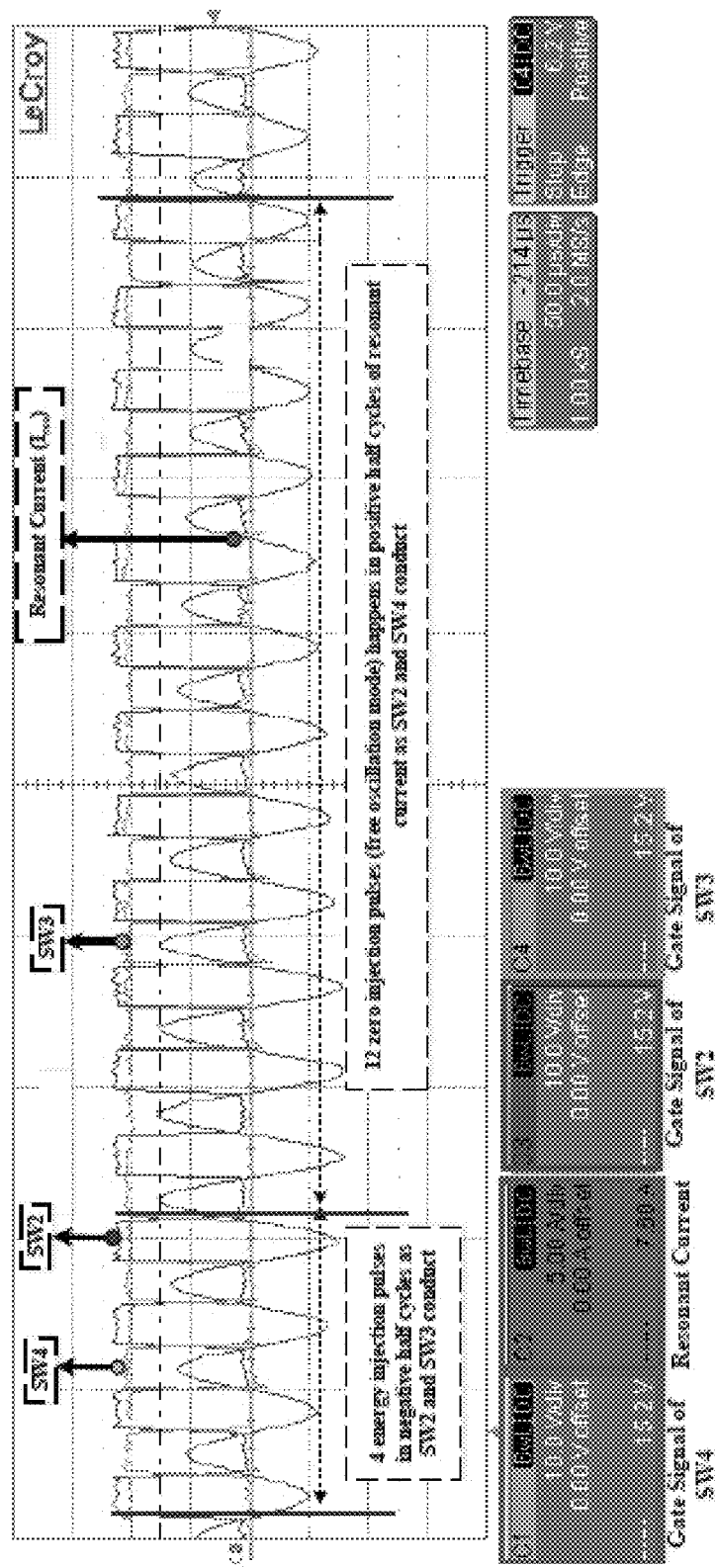

In FIGS. 10A and 10B, the IPT charging level is set at 9 by considering 5 energy injection in negative half cycles, and 4 energy injection in positive half cycles ($L_{neg}=5$ and $L_{pos}=4$). The dip switches defined as power level selectors are set as follows: $P_3P_2P_1P_0$="0101" and $N_3N_2N_1N_0$="0100". Referring to FIG. 10A, four energy injections occur during positive half cycles; accordingly, switches SW1 and SW4 conduct, and 12 free-oscillations (non-injection) occur in the remaining half cycles of control frequency and switches SW1 and SW3 conduct. Referring to FIG. 10B, five energy injections occur during negative half cycles, with switches SW2 and SW3 conducting, and 11 free-oscillations (non-injection) occur during the remaining half cycles of control frequency, with switches SW2 and SW4 conducting. Again, it is evident from FIGS. 10A and 10B that during energy injection time intervals, the resonant current magnitude increases and reaches up to the peak value of 7.6 A and the current magnitude decreases during the free oscillation time interval.

Figure 8:
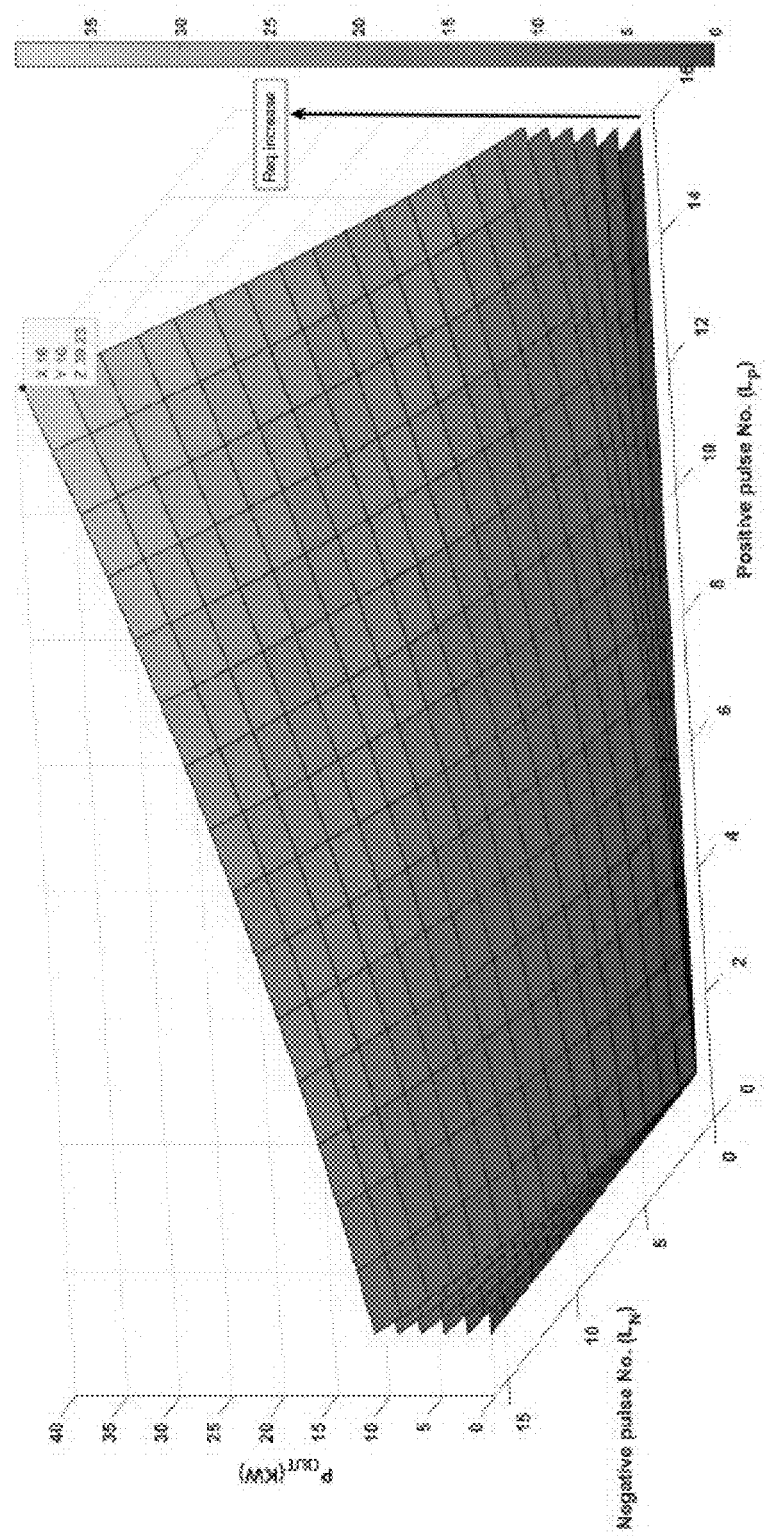
FIG. 8 shows a three-dimensional (3D) plot of output power versus energy injection in positive half cycle ($L_{pos}$) versus energy injection in negative half cycle ($L_{neg}$).
Figure 11A:
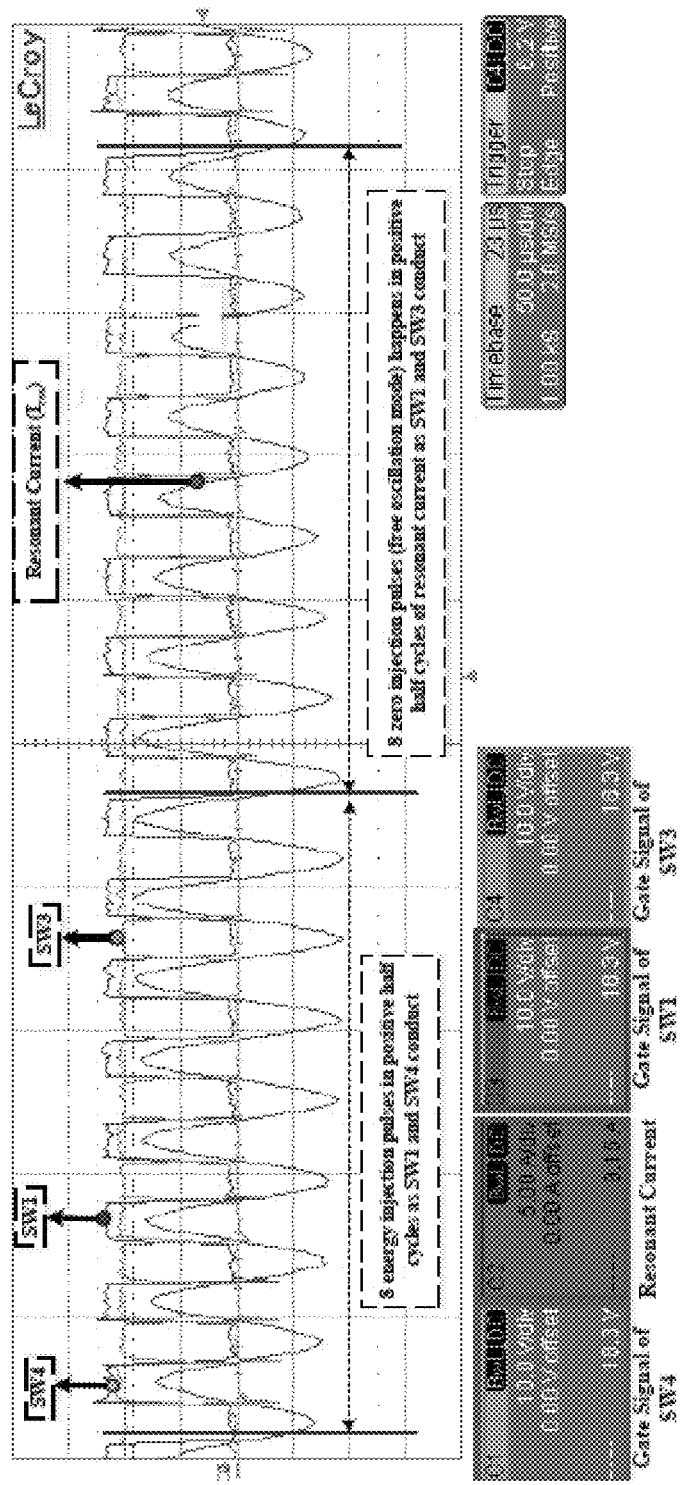
FIGS. 11A and 11B show switching signals when the multi-power level controller is set to operate in a total level of 17 ($L_{neg}$=8 and $L_{pos}$=9), with FIG. 11A showing dip switches for power level selector for positive set as $P_3P_2P_1P_0$="0111" and FIG. 11B showing dip switches for power level selector for negative set as $N_3N_2N_1N_0$="1000".
Figure 11B:
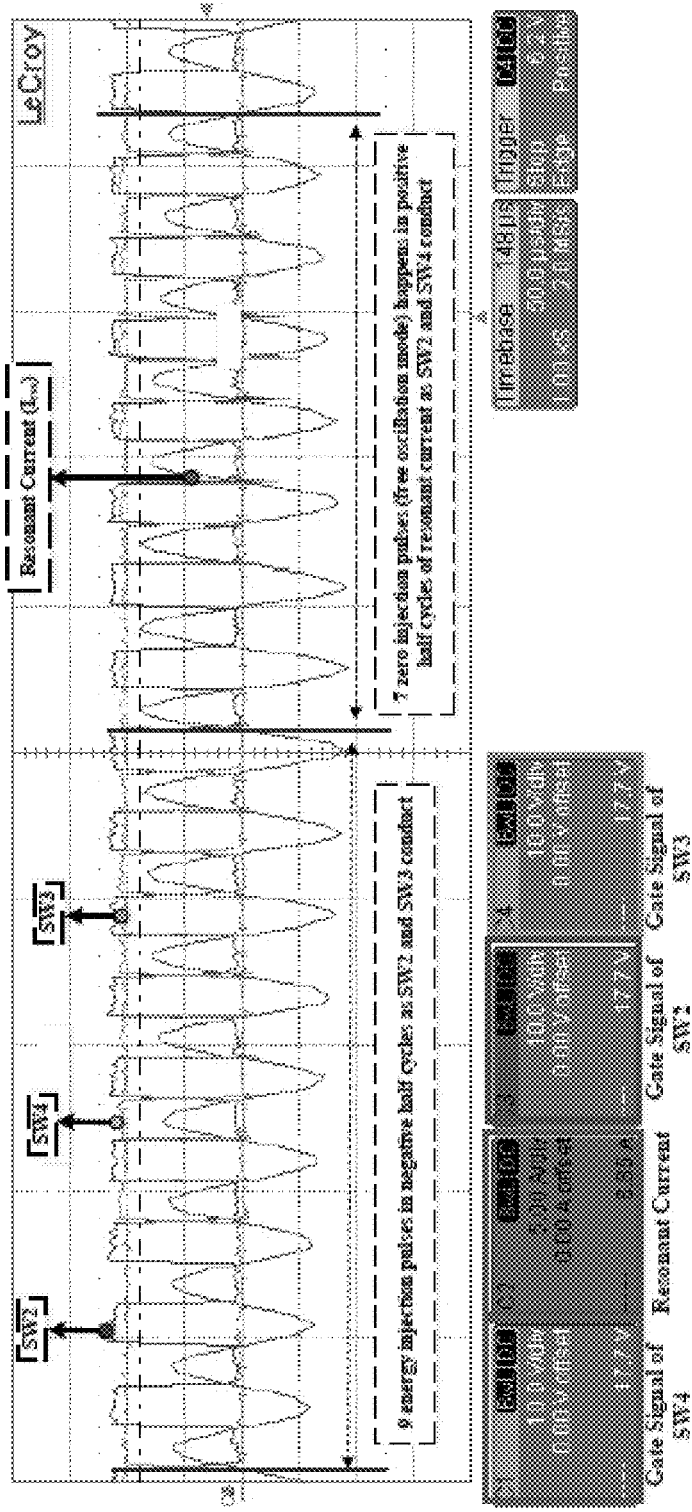

In FIGS. 11A and 11B, the IPT charging level is set at 17 by considering 8 energy injection in negative half cycles, and 9 energy injection in positive half cycles ($L_{neg}=8$ and $L_{pos}=9$). The dip switches defined as power level selectors are set as follows: $P_3P_2P_1P_0$="0111" and $N_3N_2N_1N_0$="1000". Referring to FIGS. 11A and 11B, 8 energy injections occur during positive half cycles, and 9 energy injections occur during negative half cycles. The resonant current magnitude increases up to 8.85 A.

Figure 12A:
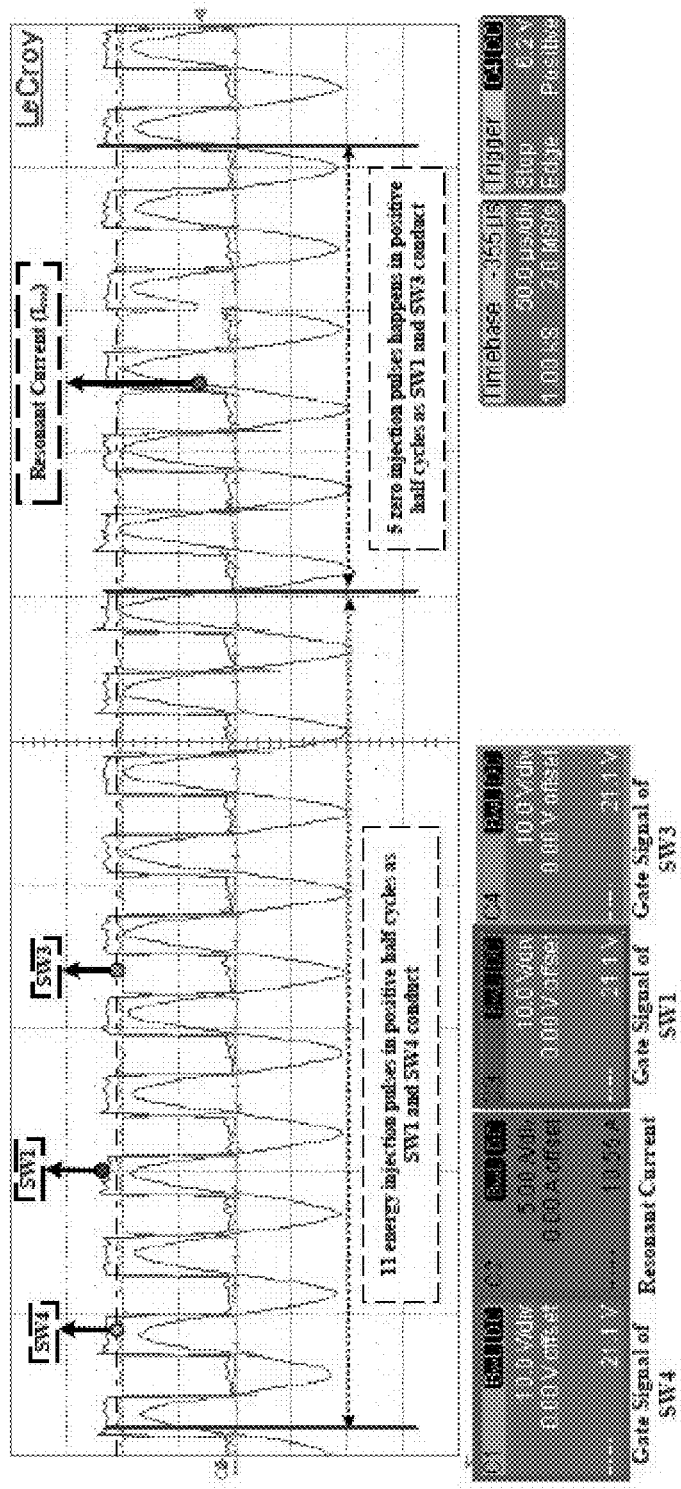
FIGS. 12A and 12B show switching signals when the multi-power level controller is set to operate in a total level of 23 ($L_{neg}$=11 and $L_{pos}$=12), with FIG. 12A showing dip switches for power level selector for positive set as $P_3P_2P_1P_0$="1010" and FIG. 12B showing dip switches for power level selector for negative set as $N_3N_2N_1N_0$="1011".
Figure 12B:
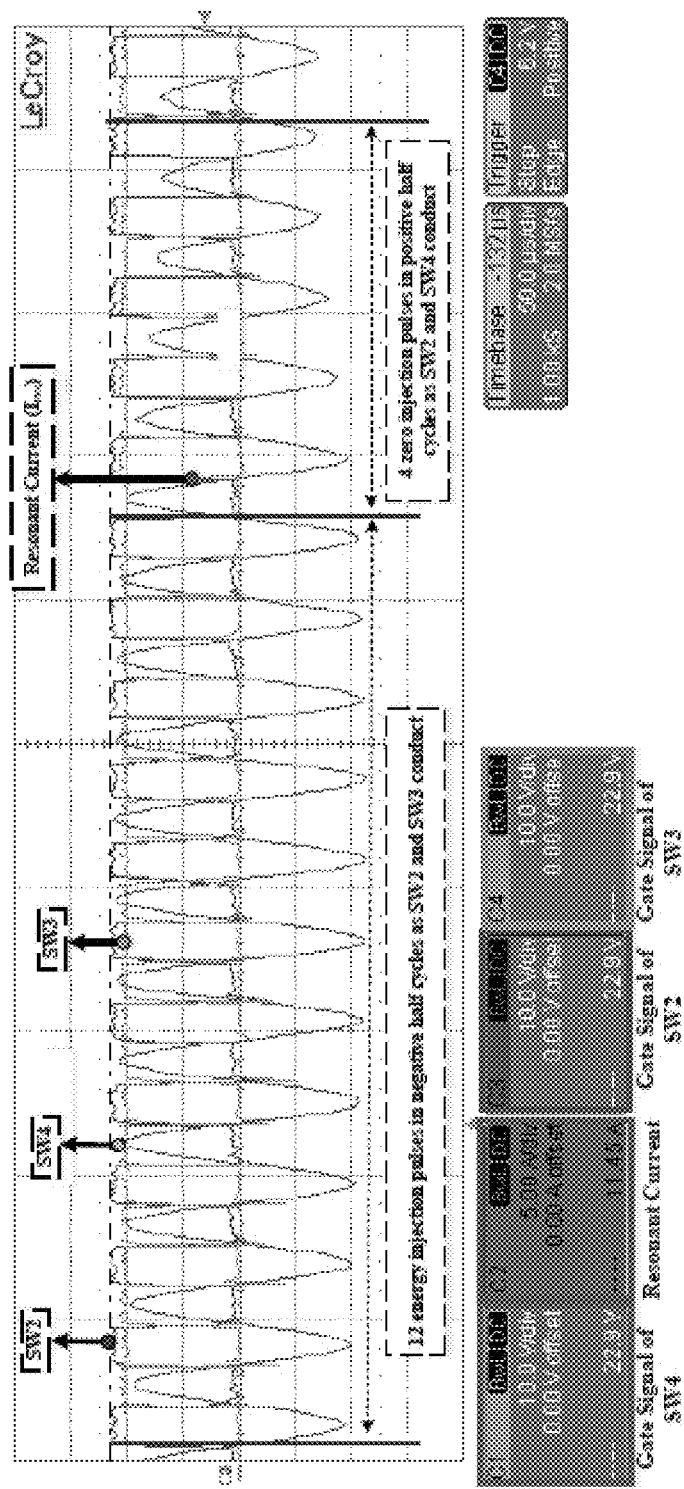

As another experimental test, the IPT charging level was set at 23 by setting the negative energy injection at 11, and positive energy injection at 12 ($L_{neg}=11$ and $L_{pos}=12$). The dip switches defined as power level selectors are set as follows: $P_3P_2P_1P_0$="1010" and $N_3N_2N_1N_0$="1011". Referring to FIGS. 12A and 12B, 11 energy injections occur during positive half cycles, and 12 energy injections occur during negative half cycles. The resonant current magnitude increases up to 11.45 A.

Figure 13A:
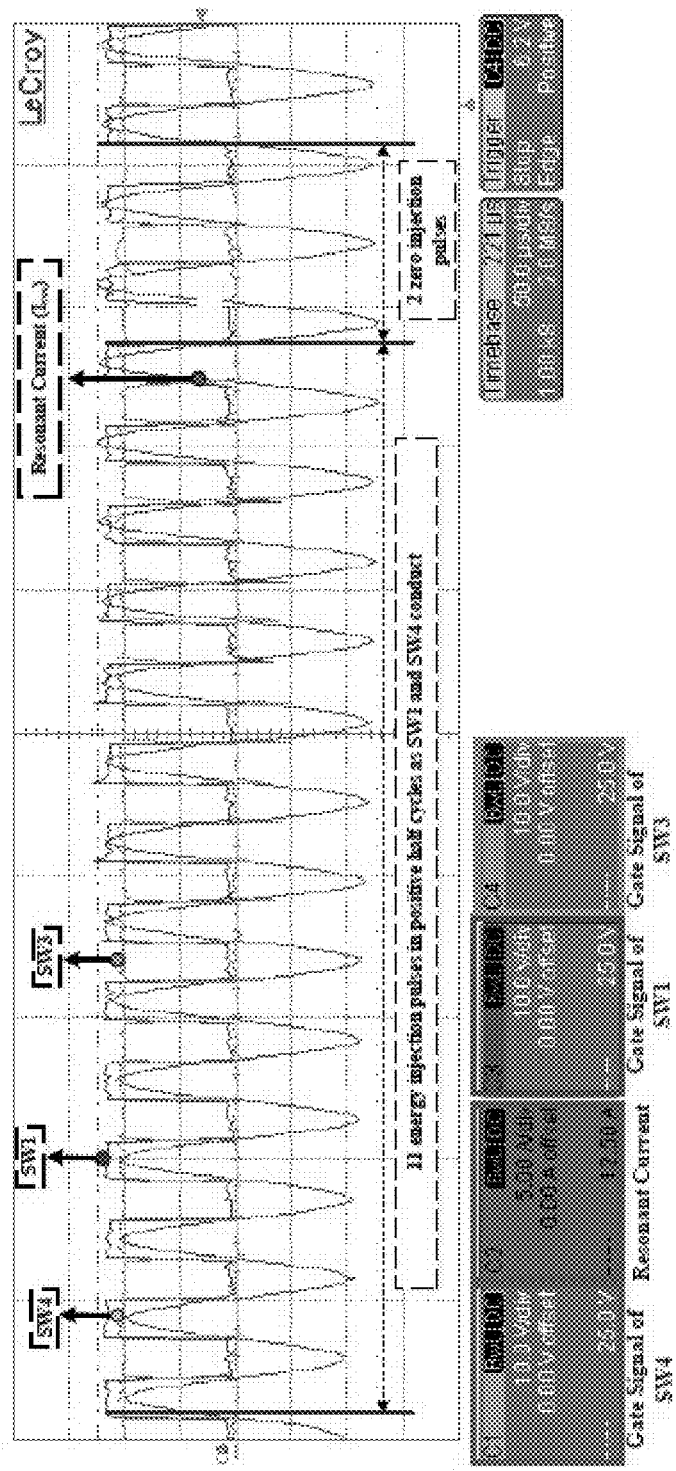
FIGS. 13A and 13B show switching signals when the multi-power level controller is set to operate in a total level of 29 ($L_{neg}$=11 and $L_{pos}$=12), with FIG. 13A showing dip switches for power level selector for positive set as $P_3P_2P_1P_0$="1101" and FIG. 13B showing dip switches for power level selector for negative set as $N_3N_2N_1N_0$="1110".
Figure 13B:
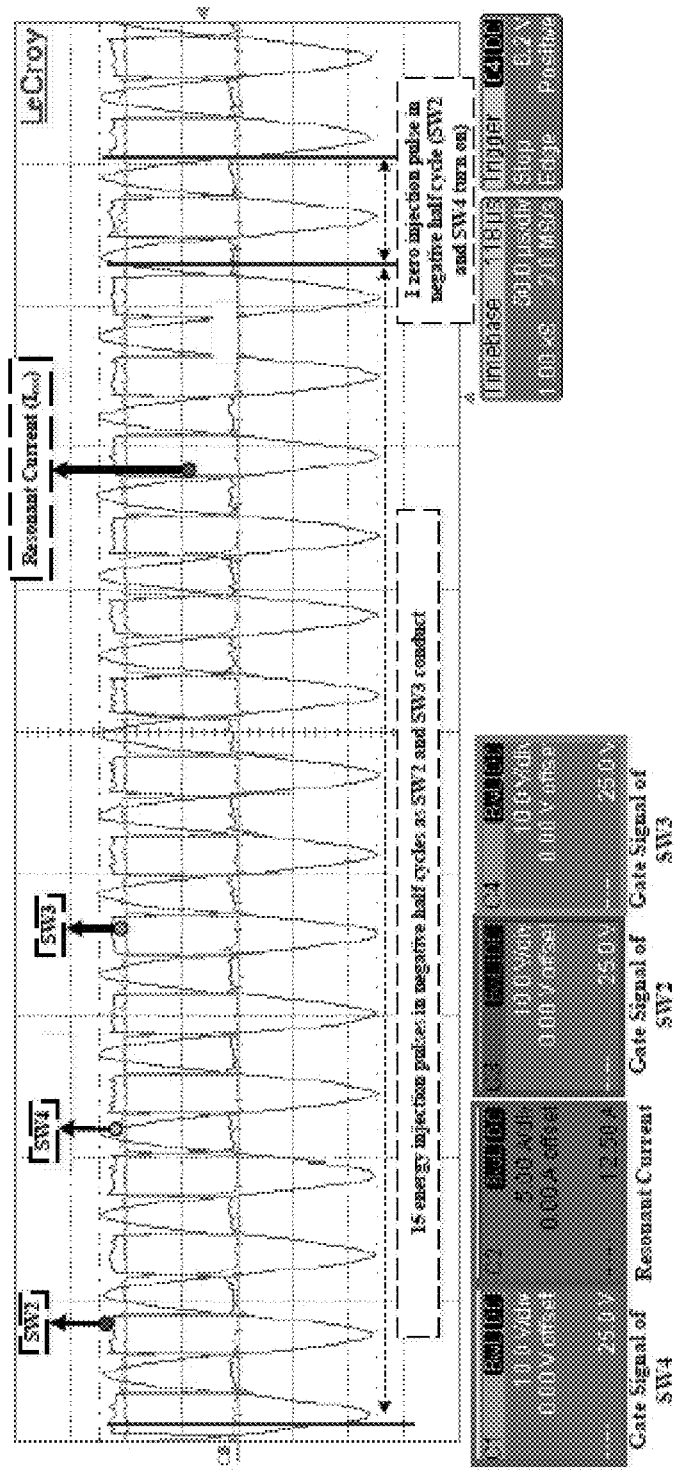

As another experimental test, the IPT charging level was set at 29 by setting the negative energy injection at 14, and positive energy injection at 15 ($L_{neg}=14$ and $L_{pos}=15$). The dip switches defined as power level selectors are set as follows: $P_3P_2P_1P_0$="1101" and $N_3N_2N_1N_0$="1110". Referring to FIGS. 13A and 13B, the results obtained verify the accurate performance of the controller of embodiments of the subject invention. The peak resonant current magnitude increased up to 12.5 A.

Figure 14A:
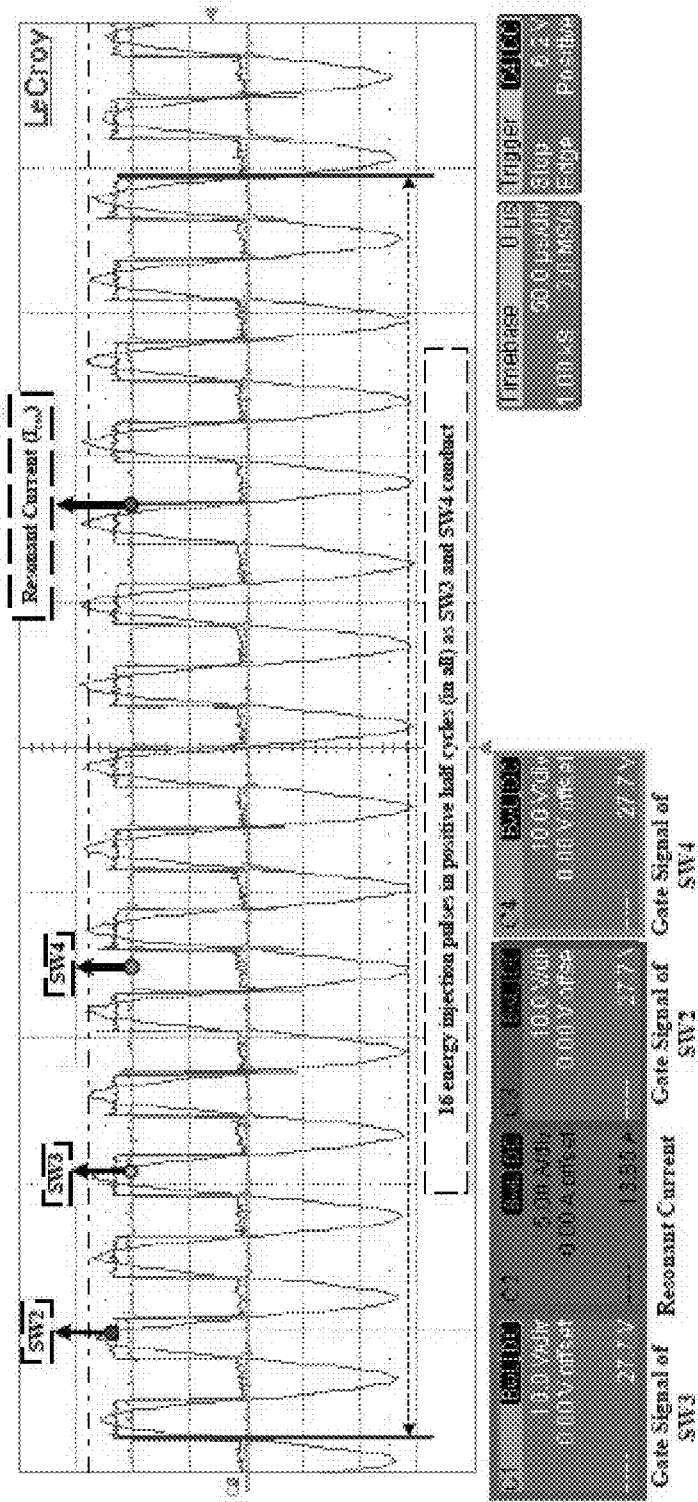
FIGS. 14A and 14B show switching signals when the multi-power level controller is set to operate in a total level of 32 ($L_{neg}$=16 and $L_{pos}$=16), with FIG. 14A showing dip switches for power level selector for positive set as $P_3P_2P_1P_0$="1111" and FIG. 14B showing dip switches for power level selector for negative set as $N_3N_2N_1N_0$="1111".
Figure 14B:
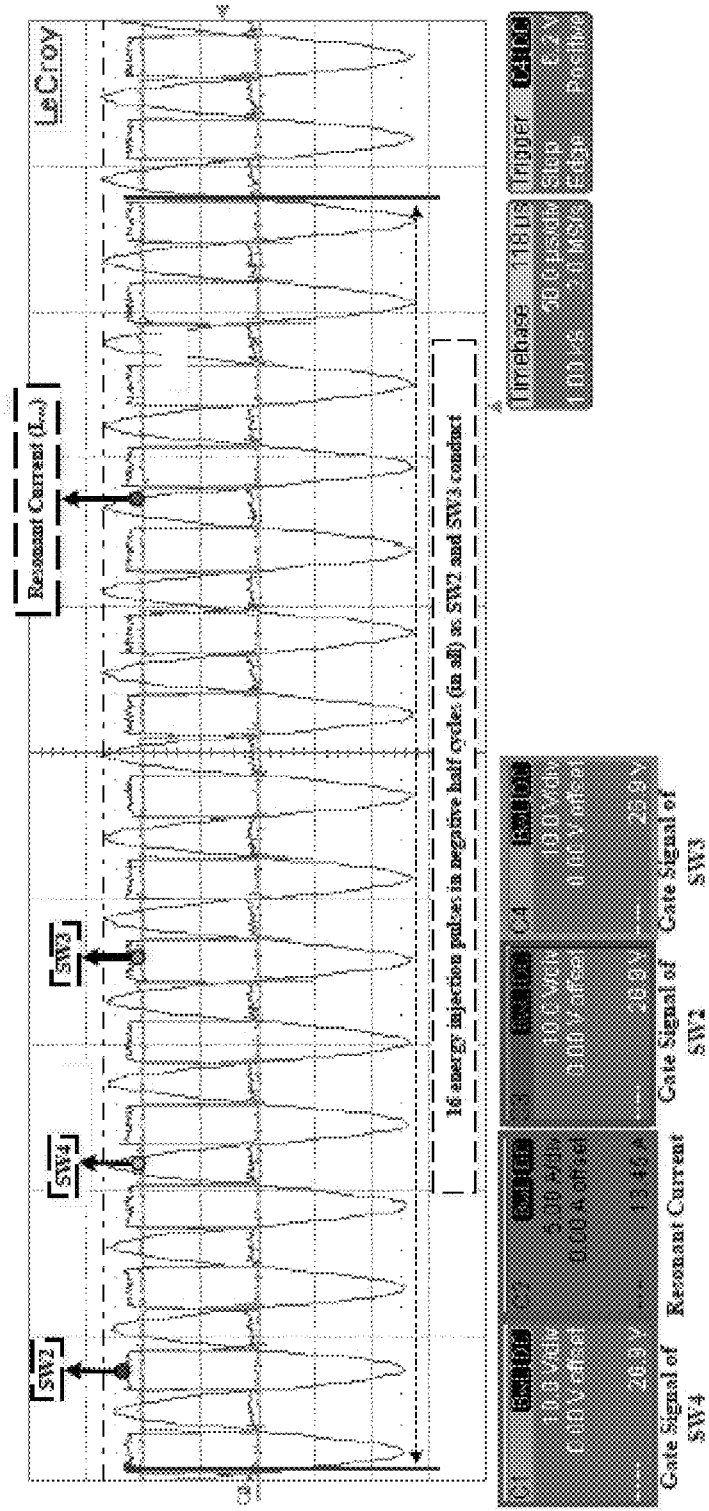

As another experiment regarding the performance validation of the controller, the IPT charging level was set at the maximum charging level (32) by considering 16 positive energy injection pulses and 16 negative energy injection pulses ($L_{neg}=16$ and $L_{pos}=16$); this was applied by setting the defined input dip switches in the FPGA board at $P_3P_2P_1P_0$="1111" and $N_3N_2N_1N_0$="1111". Referring to FIGS. 14A and 14B, the controller forced the converter to operate only in active states over all 32 half cycles of the control frequency. The resonant current magnitude increased up to 13.45 A.

Figure 15:
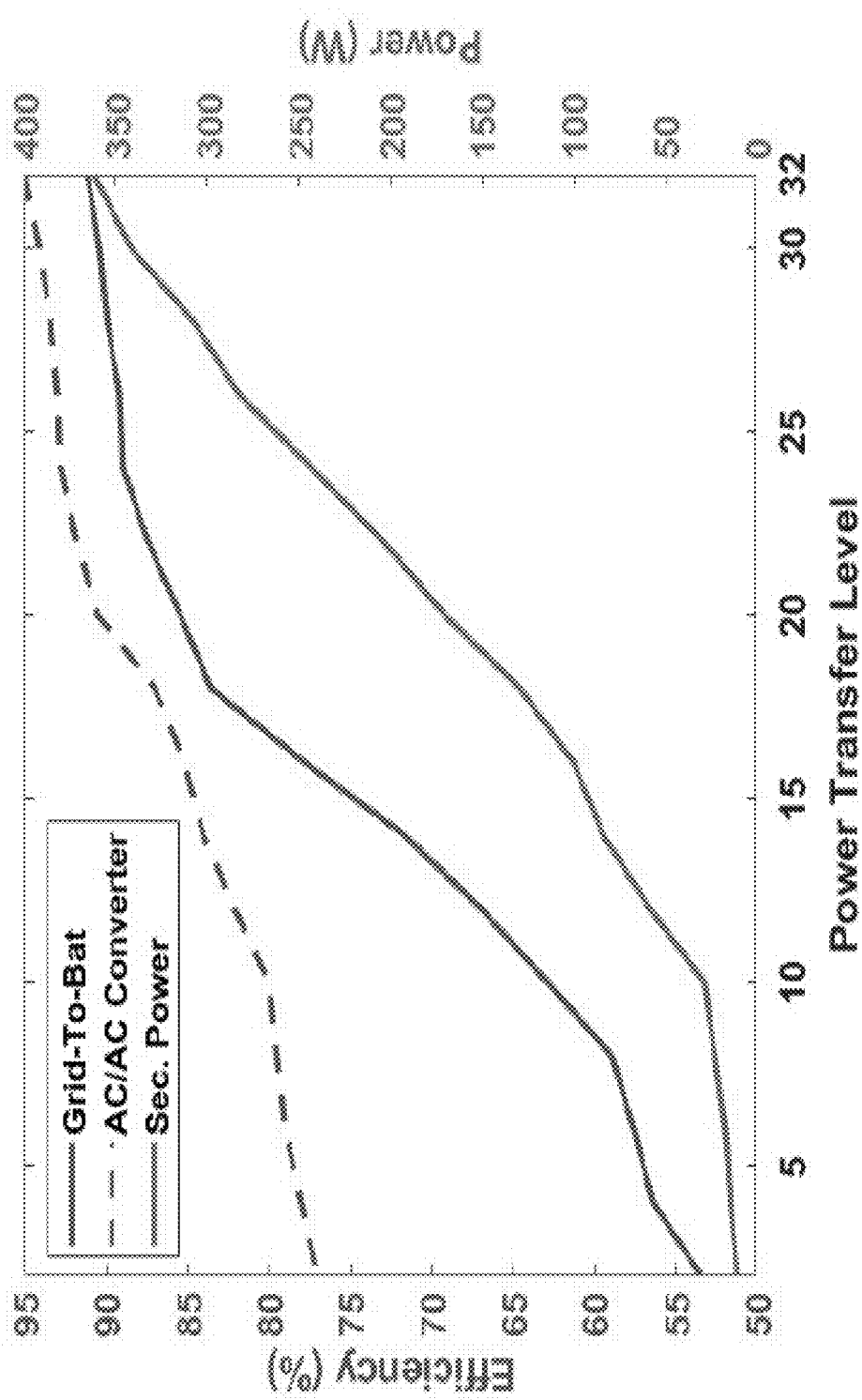
FIG. 15 shows a plot of efficiency (in %, left vertical axis) and power (in Watts (W), right vertical axis) versus power transfer level. The dotted line is for efficiency of an AC/AC converter; the solid line closer to the top of the plot is for efficiency of grid-to-battery; and the solid line closer to the bottom of the plot is for power values of the secondary power.

In an embodiment, the primary converter is a single-stage matrix AC-AC converter connected to a power supply (e.g., a single-phase supply such as a 60-Hz single-phase supply) controlled with the multi-power level controller. In the receiver side, the diode rectifier can be used for DC conversion. The grid-to-battery efficiency ($\eta G2B$), the AC-AC resonant converter efficiency ($\eta Conv$), and the rectified secondary power ($P_{rect}$) under various power transfer levels are shown in the same plot in FIG. 15. The experiments were carried out in low power range due to power supply limitations in the lab; however, it is expected that higher efficiency would be obtained if these were replicated in rated power for all power levels; the reason behind this is due to relatively lower switching loss, ferrite loss (eddy loss, proximity loss), and plate loss in high power range. Referring to FIG. 15, the $\eta G2B$, $\eta Conv$, and the secondary rectified power ($P_{rect}$) increase as the IPT's power transfer level increases, which reaches up to 91.135% at level =32. The low power efficiency of the charging system in lower charging levels is because of the increased free oscillation counts, and decreased number of energy injections. In other words, free oscillation results in conduction loss as the resonant current flows through the short-circuited LC, which increases loss.

Embodiments of the subject invention provide new multi-level IPT power controllers, which can be implemented for example on direct AC-AC converters and which may only use current and voltage measurements to produce multi-power level IPT controller and design switching logic. Using Boolean operators applied on resonant current signal (e.g., AND, OR, Not, and the like), varying positive energy injections (1 to 16 pulses) and varying negative energy injections (1 to 16 pulses), in total up to 32 different active states can be designed. Due to the synchronization of the converter's switching with the IPT system's resonant frequency, the soft switching condition (both ZCS and ZVS) can be met, thereby resulting in a highly efficient converter. The controller can be programmed in, for example, FPGA hardware, and ModelSim results are shown in FIGS. 2-4 herein. The power regulation capability of the converter was experimentally validated on an IPT testbed for various charging levels (see FIGS. 6-15). Embodiments of the subject invention can be used with high frequency converters used in IPT systems (e.g., dual-stage converters (e.g., AC-DC-AC) and matrix converters (e.g., AC-AC)). A major beneficiary of embodiments of the subject invention is the ability to increase reliance on electric vehicles for transportation.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., sub-ranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An inductive power transfer (IPT) power controller, comprising:
   a first capacitor;
   a first inductor in series with the first capacitor;
   a second inductor in operable communication with the first inductor;
   a second capacitor in series with the second inductor;
   a connection configured to be connected to a converter, the connection being in operable communication with the first capacitor;
   a processor; and
   a machine-readable medium in operable communication with the processor and having instructions stored thereon that, when executed by the processor, perform at least one algorithm that uses Boolean operators to vary positive energy injections and negative energy injections to give a plurality of discrete charging levels of the IPT power controller.

2. The IPT power controller according to claim 1, the plurality of discrete charging levels comprising at least 32 discrete charging levels.

3. The IPT power controller according to claim 1, the at least one algorithm comprising a first algorithm that varies positive energy injections and a second algorithm that varies negative energy injections.

4. The IPT power controller according to claim 3, the first algorithm varying positive energy injections over a range of from 1 to 16 pulses.

5. The IPT power controller according to claim 3, the second algorithm varying negative energy injections over a range of from 1 to 16 pulses.

6. The IPT power controller according to claim 1, the IPT power controller being configured to synchronize a resonant frequency of the IPT power controller with a switching of the converter to allow zero current switching and zero voltage switching.

7. The IPT power controller according to claim 1, the IPT power controller being implemented on a field-programmable gate array (FPGA).

8. An electric charging system, comprising:
   the IPT power controller according to claim 1; and
   an alternating current (AC)-AC matrix converter connected to the IPT power controller.

9. The electric charging system according to claim 8, the AC-AC matrix converter comprising a primary full bridge inverter that comprises four switches, and
   the AC-AC matrix converter being configured to convert from an input frequency of 60 Hertz (Hz) to a resonant frequency of at least 1 kilohertz (kHz).

10. The electric charging system according to claim 8, further comprising a gate drive circuit, a peak detector circuit, and at least one sign circuit,
    the electric charging system being implemented on a printed circuit board (PCB).

11. A method of providing inductive power transfer (IPT) power control, the method comprising:
    providing an IPT power controller, the IP power controller comprising a first capacitor, a first inductor in series with the first capacitor, a second inductor in operable communication with the first inductor, a second capacitor in series with the second inductor, and a connection configured to be connected to a converter, the connection being in operable communication with the first capacitor;
    connecting an alternating current (AC)-AC matrix converter to the connection of the IPT power controller; and
    performing at least one algorithm that uses Boolean operators to vary positive energy injections and negative energy injections to give a plurality of discrete charging levels of the IPT power controller.

12. The method according to claim 11, the plurality of discrete charging levels comprising at least 32 discrete charging levels.

13. The method according to claim 11, the at least one algorithm comprising a first algorithm that varies positive energy injections and a second algorithm that varies negative energy injections.

14. The method according to claim 13, the first algorithm varying positive energy injections over a range of from 1 to 16 pulses.

15. The method according to claim 13, the second algorithm varying negative energy injections over a range of from 1 to 16 pulses.

16. The method according to claim 11, further comprising synchronizing a resonant frequency of the IPT power controller with a switching of the AC-AC matrix converter to allow zero current switching and zero voltage switching.

17. The method according to claim 11, the IPT power controller being implemented on a field-programmable gate array (FPGA).

18. An inductive power transfer (IPT) power controller, comprising:
   a first capacitor;
   a first inductor in series with the first capacitor;
   a second inductor in operable communication with the first inductor;
   a second capacitor in series with the second inductor;
   a connection configured to be connected to a converter, the connection being in operable communication with the first capacitor;
   a processor; and
   a machine-readable medium in operable communication with the processor and having instructions stored thereon that, when executed by the processor, perform at least one algorithm that uses Boolean operators to vary positive energy injections and negative energy injections to give a plurality of discrete charging levels of the IPT power controller,
   the plurality of discrete charging levels comprising at least 32 discrete charging levels,
   the at least one algorithm comprising a first algorithm that varies positive energy injections and a second algorithm that varies negative energy injections,
   the first algorithm varying positive energy injections over a range of from 1 to 16 pulses,
   the second algorithm varying negative energy injections over a range of from 1 to 16 pulses,
   the IPT power controller being configured to synchronize a resonant frequency of the IPT power controller with a switching of the converter to allow zero current switching and zero voltage switching, and
   the IPT power controller being implemented on a field-programmable gate array (FPGA).

19. An electric charging system, comprising:
   the IPT power controller according to claim 18; and
   an alternating current (AC)-AC matrix converter connected to the IPT power controller, the AC-AC matrix converter comprising a primary full bridge inverter that comprises four switches, and
   the AC-AC matrix converter being configured to convert from an input frequency of 60 Hertz (Hz) to a resonant frequency of at least 1 kilohertz (kHz).

20. The electric charging system according to claim 19, further comprising a gate drive circuit, a peak detector circuit, and at least one sign circuit,
   the electric charging system being implemented on a printed circuit board (PCB).

* * * * *